(12) United States Patent
Yamada

(10) Patent No.: US 10,661,746 B2
(45) Date of Patent: May 26, 2020

(54) AIRBAG DEVICE FOR A FRONT PASSENGER SEAT

(71) Applicant: TOYODA GOSEI CO., LTD., Kiyosu-shi, Aichi-ken (JP)

(72) Inventor: Ikuo Yamada, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/825,291

(22) Filed: Nov. 29, 2017

(65) Prior Publication Data

US 2018/0154857 A1 Jun. 7, 2018

(30) Foreign Application Priority Data

Dec. 7, 2016 (JP) ................................ 2016-238044

(51) Int. Cl.
*B60R 21/205* (2011.01)
*B60R 21/233* (2006.01)
(Continued)

(52) U.S. Cl.
CPC .......... *B60R 21/216* (2013.01); *B60R 21/205* (2013.01); *B60R 21/231* (2013.01);
(Continued)

(58) Field of Classification Search
CPC . B60R 21/205; B60R 21/233; B60R 21/2338; B60R 2021/0004;
(Continued)

(56) References Cited

U.S. PATENT DOCUMENTS 7,152,880 B1 * 12/2006 Pang ..................... B60R 21/233
280/743.2
8,882,138 B1 * 11/2014 Hicken ................. B60R 21/231
280/730.1
(Continued)

FOREIGN PATENT DOCUMENTS

JP  2005-271736 A  10/2005
JP  2016-40155 A  3/2016
(Continued)

OTHER PUBLICATIONS

Office Action dated Nov. 21, 2019 issued in corresponding JP patent application No. 2016-238044 (and English translation).

*Primary Examiner* — Barry Gooden, Jr.
(74) *Attorney, Agent, or Firm* — Posz Law Group, PLC

(57) ABSTRACT

An airbag device for a passenger seat is disclosed. The airbag includes a main section whose rear plane forms a front-collision arresting plane, and a sub section which is disposed on a side of the main section and includes a protruding region protruding farther rearward than the main section. The side plane of the protruding region forms an oblique-collision arresting plane. Between the front-collision- and oblique-collision arresting planes is an arresting recess denting forward. The airbag further internally includes a front-rear tether jointed to the front-collision arresting plane, and a recess-pulling tether jointed to the bottom of the arresting recess. The front-rear tether and recess-pulling tethers share a mounting base by which the tethers are mounted on an airbag case, and bifurcate from the mounting base. The front-rear tether extends from a rear edge of the mounting base, and the recess-pulling tether extends from an edge of the mounting base adjoining the front-rear tether.

9 Claims, 20 Drawing Sheets

(51) Int. Cl.
  *B60R 21/2338* (2011.01)
  *B60R 21/216* (2011.01)
  *B60R 21/26* (2011.01)
  *B60R 21/231* (2011.01)
  *B60R 21/00* (2006.01)
(52) U.S. Cl.
  CPC .......... *B60R 21/2338* (2013.01); *B60R 21/26* (2013.01); *B60R 2021/0004* (2013.01); *B60R 2021/0009* (2013.01); *B60R 2021/23107* (2013.01); *B60R 2021/23382* (2013.01)
(58) Field of Classification Search
  CPC .. B60R 2021/0048; B60R 2021/23308; B60R 2021/23382
  See application file for complete search history.

(56) References Cited

U.S. PATENT DOCUMENTS

| | | | | |
|---|---|---|---|---|
| 9,187,055 | B1* | 11/2015 | Genthikatti | B60R 21/2338 |
| 9,272,684 | B1* | 3/2016 | Keyser | B60R 21/237 |
| 9,758,123 | B2* | 9/2017 | Yamada | B60R 21/2338 |
| 10,023,144 | B2* | 7/2018 | Taguchi | B60R 21/205 |
| 10,351,090 | B2* | 7/2019 | Yamada | B60R 21/205 |
| 2003/0234520 | A1* | 12/2003 | Hawthorn | B60R 21/16 |
| | | | | 280/728.1 |
| 2005/0098994 | A1* | 5/2005 | Matsumura | B60R 21/231 |
| | | | | 280/743.1 |
| 2005/0212276 | A1 | 9/2005 | Yamada | |
| 2006/0249934 | A1* | 11/2006 | Hasebe | B60R 21/231 |
| | | | | 280/729 |
| 2008/0048420 | A1* | 2/2008 | Washino | B60R 21/203 |
| | | | | 280/731 |
| 2009/0302587 | A1* | 12/2009 | Thomas | B60R 21/231 |
| | | | | 280/743.2 |
| 2010/0102542 | A1* | 4/2010 | Nakajima | B60R 21/233 |
| | | | | 280/743.2 |
| 2011/0140401 | A1* | 6/2011 | Fischer | B60R 21/233 |
| | | | | 280/743.1 |
| 2013/0320656 | A1* | 12/2013 | Yamada | B60R 21/2338 |
| | | | | 280/743.2 |
| 2015/0166002 | A1* | 6/2015 | Fukawatase | B60R 21/233 |
| | | | | 280/730.1 |
| 2015/0343986 | A1* | 12/2015 | Schneider | B60R 21/205 |
| | | | | 280/729 |
| 2015/0367802 | A1* | 12/2015 | Fukawatase | B60R 21/205 |
| | | | | 280/732 |
| 2016/0001733 | A1* | 1/2016 | Kim | B60R 21/233 |
| | | | | 280/728.3 |
| 2016/0046254 | A1* | 2/2016 | Yamada | B60R 21/233 |
| | | | | 280/729 |
| 2016/0046257 | A1* | 2/2016 | Yamada | B60R 21/2338 |
| | | | | 280/729 |
| 2016/0059817 | A1* | 3/2016 | Umehara | B60R 21/233 |
| | | | | 280/729 |
| 2016/0159306 | A1 | 6/2016 | Fujiwara | |
| 2016/0159311 | A1* | 6/2016 | Yamada | B60R 21/233 |
| | | | | 280/729 |
| 2016/0207490 | A1* | 7/2016 | Yamada | B60R 21/2338 |
| 2017/0036639 | A1* | 2/2017 | Yamada | B60R 21/205 |
| 2017/0129439 | A1* | 5/2017 | Taguchi | B60R 21/205 |
| 2017/0136981 | A1* | 5/2017 | Fukawatase | B60R 21/233 |
| 2017/0158154 | A1* | 6/2017 | Kobayashi | B60R 21/01332 |
| 2017/0217397 | A1* | 8/2017 | Sumiya | B60R 21/233 |
| 2017/0355344 | A1* | 12/2017 | Choi | B60R 21/231 |
| 2017/0355346 | A1* | 12/2017 | Kobayashi | B60R 21/0136 |
| 2018/0015902 | A1* | 1/2018 | Maenishi | B60R 21/205 |
| 2018/0022303 | A1* | 1/2018 | Yamada | B60R 21/205 |
| | | | | 280/732 |
| 2018/0029557 | A1* | 2/2018 | Yamada | B60R 21/2338 |
| 2018/0056922 | A1* | 3/2018 | Yamada | B60R 21/205 |
| 2018/0065581 | A1* | 3/2018 | Ohno | B60R 21/01558 |
| 2018/0065583 | A1* | 3/2018 | Tabushi | B60R 21/233 |
| 2018/0065587 | A1* | 3/2018 | Maenishi | B60R 21/205 |
| 2018/0111583 | A1* | 4/2018 | Jaradi | B60R 21/231 |
| 2018/0154856 | A1* | 6/2018 | Yamada | B60R 21/231 |
| 2018/0162312 | A1* | 6/2018 | Faruque | B60R 21/239 |
| 2018/0208143 | A1* | 7/2018 | Fischer | B60R 21/205 |
| 2018/0345901 | A1* | 12/2018 | Yamada | B60R 21/2338 |
| 2018/0354450 | A1* | 12/2018 | Yamada | B60R 21/23138 |
| 2019/0291681 | A1* | 9/2019 | Nakajima | B60R 21/233 |
| 2019/0351862 | A1* | 11/2019 | Aranzulla | B60R 21/2338 |

FOREIGN PATENT DOCUMENTS

| | | |
|---|---|---|
| JP | 2016-107721 A | 6/2016 |
| JP | 2016-132385 A | 7/2016 |

* cited by examiner

AIRBAG DEVICE FOR A FRONT PASSENGER SEAT

CROSS REFERENCE TO RELATED APPLICATIONS

The Present application claims priority from Japanese Patent Application No. 2016-238044 of Yamada, filed on Dec. 7, 2016, the entire disclosure of which is incorporated herein by reference.

BACKGROUND OF THE INVENTION

1. Field of the Invention

The present invention relates to an airbag device for a front passenger seat adapted to be mounted on an instrument panel of a vehicle in front of the front passenger seat. More particularly, the invention relates to an airbag device for a front passenger seat including an airbag which is housed in a housing in a folded-up configuration and deployable rearward for protecting a passenger when fed with an inflation gas.

2. Description of Related Art

JP 2016-132585 A discloses a known airbag device for a front passenger seat whose airbag includes a main bag section which is mounted on a housing by the front end region and deployable rearward and a sub bag section which is disposed on a side of the main bag section and includes a protruding region deployable farther rearward than the main bag section. The rear portion of this airbag as deployed serves as a passenger protection region. The passenger protection region includes a front-collision arresting plane which is composed of a rear portion of the main bag section and an oblique-collision arresting plane which is composed of a side plane of the protruding region of the sub bag section facing towards the front-collision arresting plane. The passenger protection region further includes, between the front-collision arresting plane and oblique-collision arresting plane, an arresting recess which is recessed forward for receiving and arresting the head of a passenger therein. Furthermore, the airbag includes a recess-pulling tether which is jointed to the leading end (i.e. bottom) of the arresting recess for preventing the arresting recess from moving rearward at airbag deployment.

JP 2016-40155 A discloses another known airbag device for a front passenger seat having an airbag which includes a main bag section, a sub bag section and such a passenger protection region as that of the former reference. The airbag of this reference does not include an arresting recess, but includes a front-rear tether which connects the front end portion of the airbag and front-collision arresting plane. The front-rear tether deploys generally along a front and rear direction and prevents the front-collision arresting plane from moving rearward at airbag deployment.

Both of the above-referenced airbag devices includes an outer tether which connects the front end portion of the sub bag section and a vicinity of the housing on an outside of the airbag. The outer tether prevents the sub bag section from protruding diagonally rearward in an undue fashion and oscillating in a front and rear direction at airbag deployment. However, such an outer tether complicates the manufacturing process of the airbag and increases the workload and cost in manufacturing of the airbag.

SUMMARY OF THE INVENTION

An object of the present invention is to provide an airbag device for a front passenger seat which is capable of deploying an airbag quickly with a simple configuration, and more particularly, an airbag device which is capable of suppressing the airbag from oscillating in a front and rear direction during deployment.

The object of the invention will be achieved by a following airbag device for a front passenger seat:

The airbag device for a front passenger seat is adapted to be mounted on an instrument panel of a vehicle disposed in front of a front passenger seat. The airbag device includes a housing which is adapted to be mounted on the instrument panel, an airbag which is housed in the housing in a folded-up configuration and inflatable with an inflation gas, and a mounting member which mounts the airbag on or at a vicinity of the housing. The airbag includes:

a main bag section which is mounted on the housing by the front end portion with the aid of the mounting member, and deployable rearward out of the housing, a rear plane of the main bag section serving as a front-collision arresting plane for protecting a head of a front seat passenger in the event of a frontal collision of the vehicle;

a sub bag section that is disposed at least either on a right side or left side of the main bag section and includes a protruding region which protrudes farther rearward than the main bag section at airbag deployment, a side plane of the protruding region which rises rearward out of the front-collision arresting plane and faces towards the front-collision arresting plane serves as an oblique-collision arresting plane for protecting the head of the passenger in the event of an oblique-collision or an offset collision of the vehicle;

an arresting recess that is recessed forward between the front-collision arresting plane and oblique-collision arresting plane for receiving and arresting the head of the passenger therein;

a front-rear tether that is disposed inside the airbag and connects a front end portion of the airbag and the front-collision arresting plane for preventing the front-collision arresting plane from moving rearward at airbag deployment, the front-rear tether being deployable generally along a front and rear direction;

a recess-pulling tether that is disposed inside the airbag and jointed to a bottom of the arresting recess for preventing the arresting recess from moving rearward at airbag deployment; and a mounting base of the front-rear tether and the recess-pulling tether by which the front-rear tether and recess-pulling tether are mounted on the housing with the aid of the mounting member together with the main bag section.

Specifically, the front-rear tether and the recess-pulling tether share the mounting base, and are configured to bifurcate rearward out of the mounting base. The front-rear tether extends from a rear edge region of the mounting base and the recess-pulling tether extends from an edge region of the mounting base adjoining the front-rear tether.

In the airbag device for a front passenger seat of the invention, the recess-pulling tether, which is jointed to the bottom of the arresting recess, and the front-rear tether, which is deployable generally along a front and rear direction inside the main bag section for preventing the front-collision arresting plane from moving rearward, share the mounting base and are configured to bifurcate out of the mounting base. The recess-pulling tether and front-rear tether are mounted on the main bag section by the mounting base. Further, the mounting base is mounted on the housing through the use of the mounting member together with the main bag section. In other words, the recess-pulling tether is configured to extend from a position dislocated from the front-rear tether in a left and right direction towards the sub bag section. With this configuration, the recess-pulling tether deploys generally along a front and rear direction, with little inclination with respect to a front and rear direction, thus is capable of pulling the arresting recess forward forcefully at the position dislocated from the front-rear tether. Accordingly, in an initial stage of airbag deployment, the recess-pulling tether and front-rear tether will prevent an extensive area in a left and right direction of the main bag section and sub bag section from protruding rearward unduly out of the housing, and further prevent the airbag from bouncing back forward thereafter. That is, even without an outer tether, the configuration of the invention will prevent the airbag including the sub bag section from oscillating in a front and rear direction repeatedly during deployment. As a consequence, the airbag of the airbag device of the invention will deploy in a desired outer contour quickly. Moreover, the recess-pulling tether and front-rear tether are both disposed inside the airbag and both mounted on the housing by the shared mounting base, with only one mounting member. This will simplify the configuration of the airbag and mounting work on the housing, and further reduce the workload and cost in manufacturing of the airbag.

Therefore, the airbag device for a front passenger seat of the invention is capable of deploying the airbag quickly with a simple configuration, by suppressing the airbag from oscillating in a front and rear direction during deployment.

In the airbag device of the invention, moreover, the arresting recess is disposed between the front-collision arresting plane and oblique-collision arresting plane for receiving and arresting the head of a passenger therein. Since the recess-pulling tether keeps the arresting recess recessed or dented during airbag deployment, the arresting recess will smoothly receive and arrest the passenger's head, which has been guided by the oblique-collision arresting plane, in the event of an oblique collision or an offset collision of the vehicle.

In the airbag device of the invention, it is desired that the airbag further internally includes a regulating tether which connects the bottom of the arresting recess and a side plane of the sub bag section which is opposed to the oblique-collision arresting plane in a left and right direction, such that the regulating tether helps deploy the arresting recess generally along a moving direction of the head of the passenger which moves diagonally forward.

With such a regulating tether, at airbag deployment, the passenger's head, which has moved diagonally forward, will enter into the arresting recess disposed generally along the moving direction the passenger's head, and accordingly, the head will be prevented from being engaged with only either one of the inner surfaces of the arresting recess. As a consequence, the arresting recess will catch the passenger's head in a balanced fashion with both of the inner surfaces, without turning the head in a left and right direction.

Furthermore, in the airbag device of the invention, the recess-pulling tether is desirably configured such that its edge in a width direction facing towards the sub bag section extends from the front edge region of the mounting base. This configuration will further help reduce the inclination of the recess-pulling tether with respect to a front and rear direction at airbag deployment, thus enabling the recess-pulling tether to pull the arresting recess forward further forcefully.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
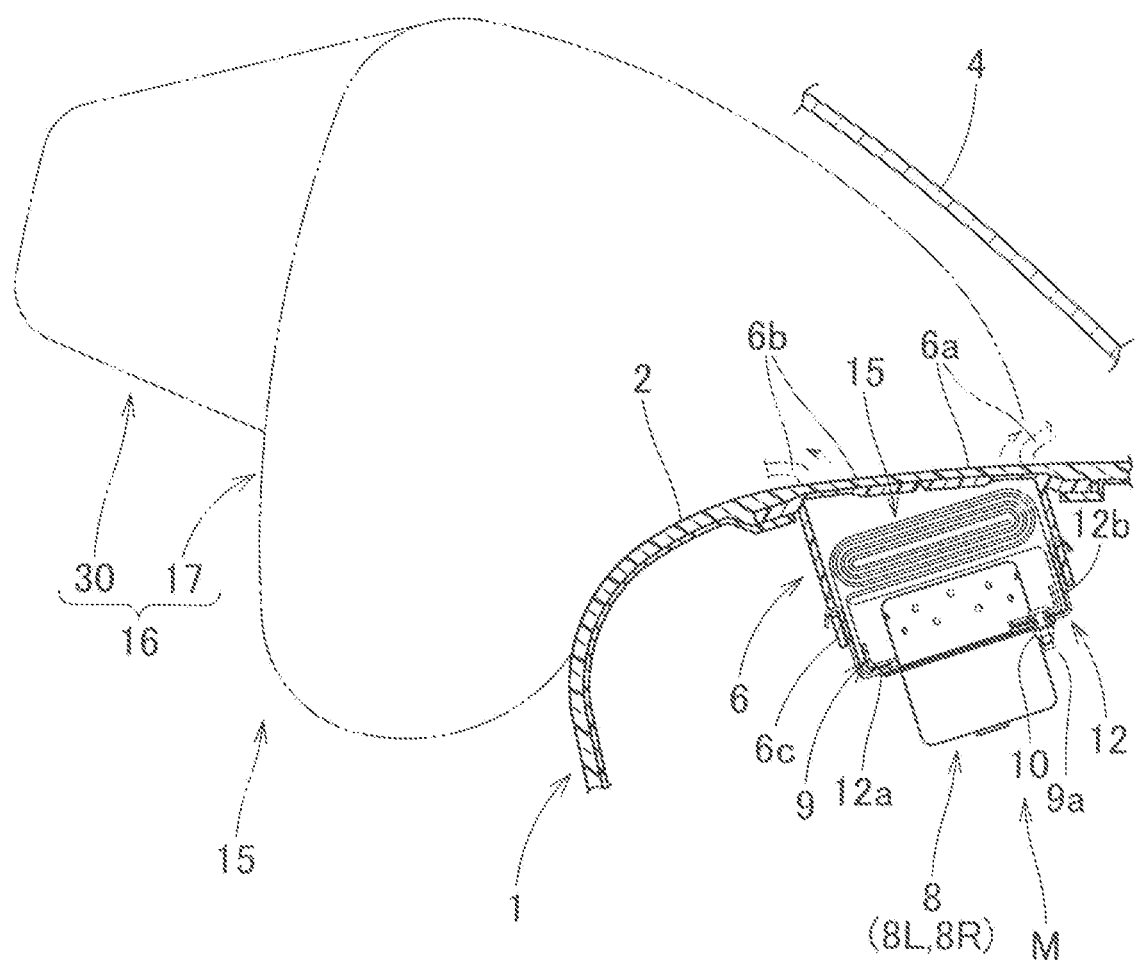
FIG. 1 is a schematic vertical section of an airbag device for a front passenger seat embodying the invention as mounted on a vehicle.
Figure 15:
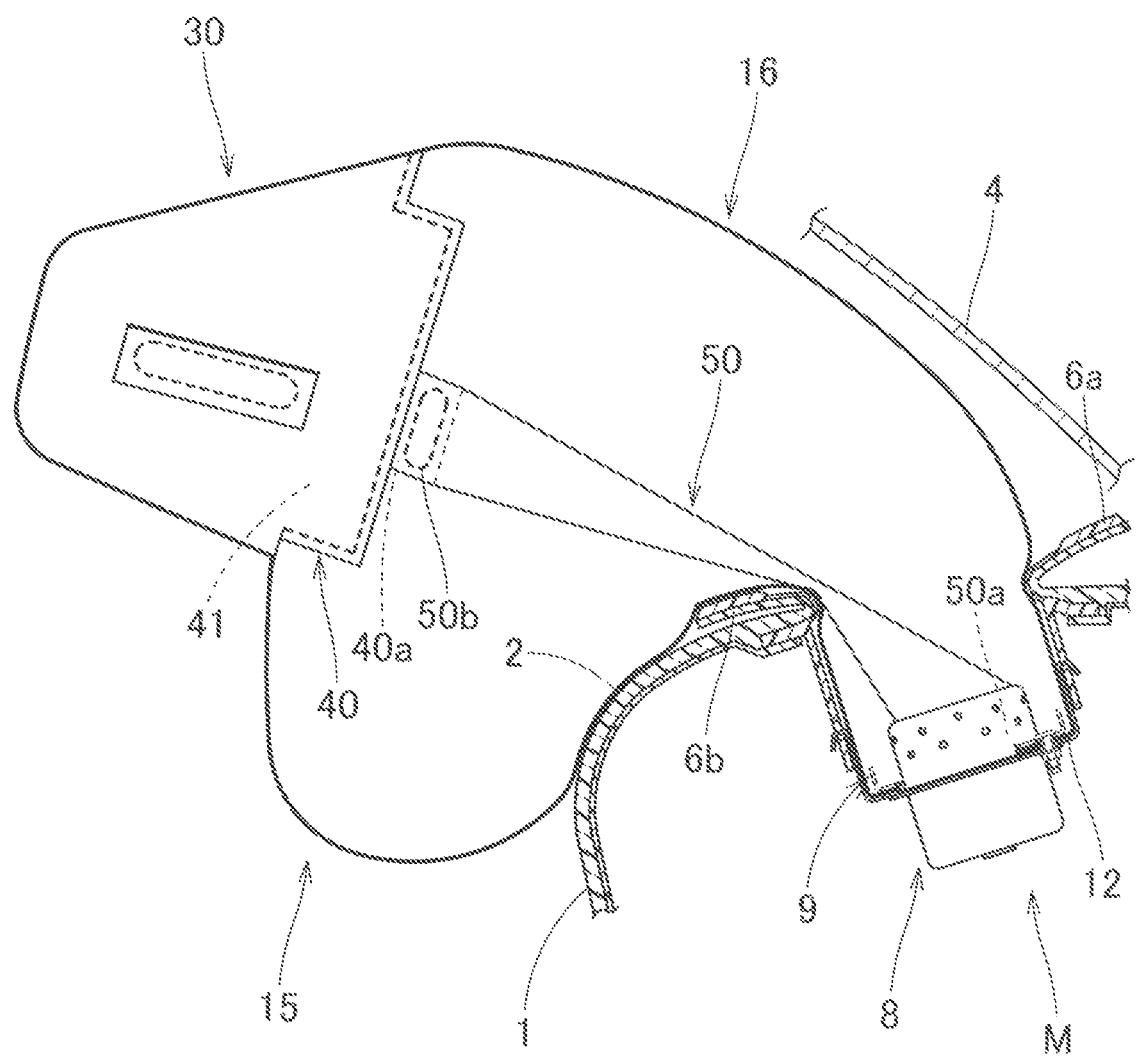
FIG. 15 is a schematic vertical section of the airbag device of FIG. 1 showing the airbag as completed deployment.

As shown in FIGS. 1 and 15, an airbag device M for a front passenger seat embodying the invention is a top-mount airbag device stored inside a top plane 2 of an instrument panel or dashboard 1 in front of a front passenger seat PS of the vehicle V1. Unless otherwise specified, front-rear, up-down and left-right directions in this specification are intended to refer to front-rear, up-down and left-right directions of the vehicle V1.

As shown in FIG. 1, the airbag device M includes an airbag 15, which is folded up, two inflators 8 (8L and 8R) for supplying the airbag 15 with an inflation gas, a case or housing 12 for housing and holding the airbag 15 and inflators 8 (8L and 8R), a retainer 9 for mounting the airbag 15 and inflators 8 on the case 12, and an airbag cover 6 for covering the airbag 15 from above.

The airbag cover 6 is integral with the dashboard 1 made from synthetic resin and includes two doors, i.e. front and rear doors 6a and 6b, which are designed to open when pushed by the airbag 15 upon airbag deployment. The airbag cover 6 further includes, around the doors 6a and 6b, a joint wall 6c which is coupled to the case 12.

Figure 13:
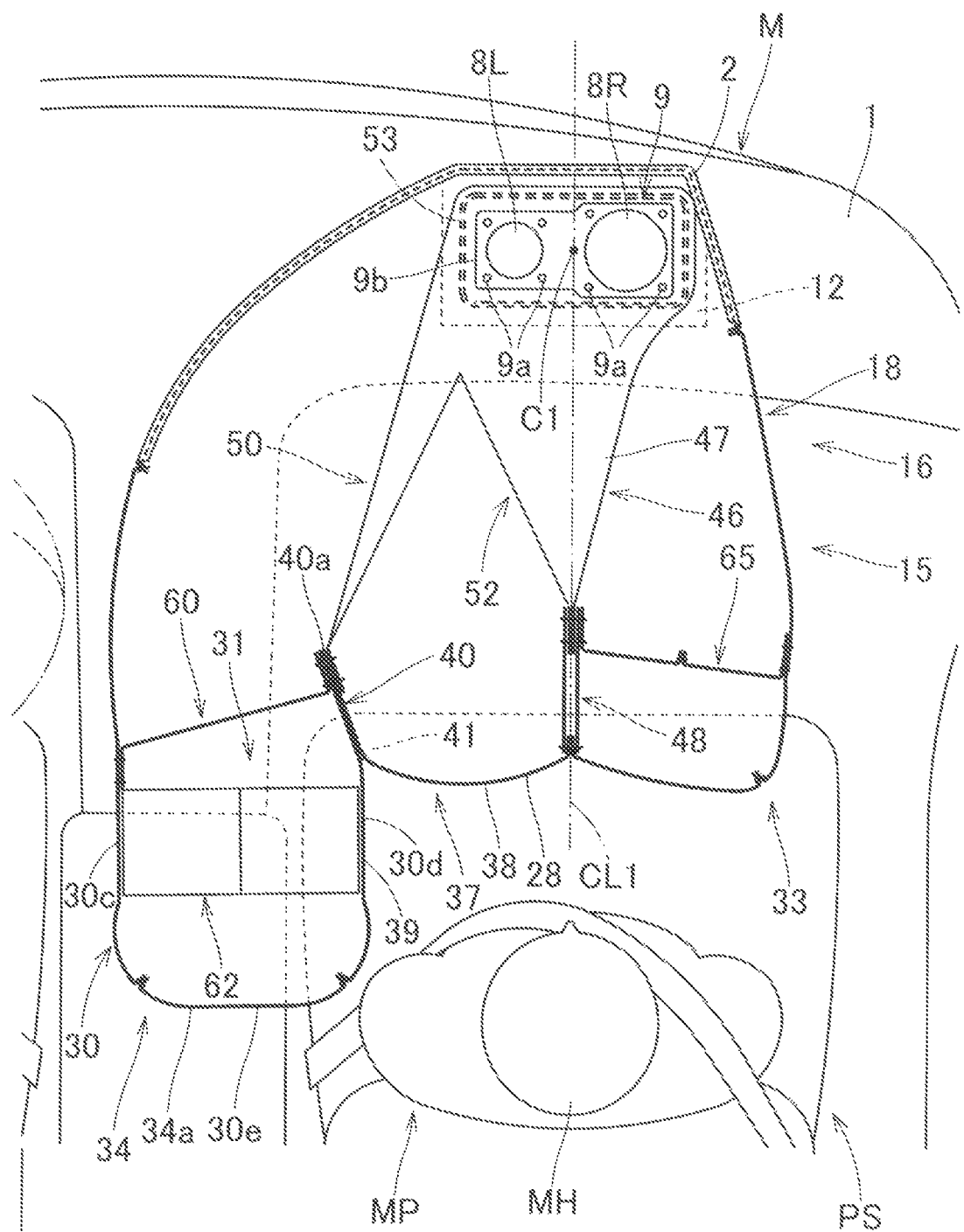
FIG. 13 is a schematic horizontal sectional view of the airbag device of FIG. 1 showing the airbag as completed deployment.

As shown in FIG. 13, the inflators 8 of the illustrated embodiment are disposed side by side in a left and right direction. In the illustrated embodiment, the inflator 8L disposed on the left side is smaller in outer contour (i.e. has a smaller power) than the inflator 8R disposed on the right side. Although the inflators 8L and 8R are different from each other in size, they have the same configuration. As shown in FIG. 1, each of the inflators 8 (8L and 8R) includes a main body 8a which is formed into a generally pot-like shape and provided with a plurality of gas discharge ports 8b, and a flange 8c for attachment to the case 12. Each of the inflators 8 (8L and 8R) of this specific embodiment is designed to be actuated in the event of a frontal collision, an oblique collision or an offset collision of the vehicle V1.

As shown in FIG. 1, the case or housing 12 is made of sheet metal into a generally rectangular parallelepiped with a rectangular opening at the top, and includes a generally rectangular bottom wall 12a which the inflators 8 are inserted through and mounted on from below, and a circumferential wall 12b which extends upward from the outer edge of the bottom wall 12a and retains the joint wall 6c of the airbag cover 6. The airbag 15 and inflators 8 (8L and 8R) are attached to the bottom wall 12a of the case 12 through the use of the bolts 9a of the retainer 9 serving as a mounting member. Further, unillustrated brackets are provided on the bottom wall 12a of the case 12 for mounting on a vehicle body structure.

The retainer (mounting member) 9 is formed generally into a rectangular plate elongated in a left and right direction. The retainer 9 is provided with two openings (reference numeral omitted) for receiving the main bodies 8a of the inflators 8L and 8R, and a plurality of bolts 9a which are disposed around each of the openings and protrude downwardly. In the illustrated embodiment, four each bolts 9a are disposed in a periphery of each of the openings. The retainer 9 is located inside the airbag 15 such that the bolts 9a, which serve as mounting means, go through the peripheries of later-described gas inlet ports 21 (21L and 21R) of the airbag 15, the bottom wall 12a of the case 12 and each of the flanges 8c of the inflators 8, and the bolts 9a are fastened with nuts 10. Thus the airbag 15 and inflators 8 (8L and 8R) are attached to the bottom wall 12a of the case 12. As described later, when the airbag 15 and inflators 8 are mounted on the case 12 with the aid of the retainer 9, a later-described mounting base 53 of the front-rear tether 46 and recess-puling tether 50 are also mounted on the case 12.

Referring to FIGS. 3 to 7, the airbag 15 includes a bag body 16 inflatable with an inflation gas, and tethers 46, 50, 60, 62 and 65 which are disposed inside the bag body 16 for controlling the contour of the bag body 16 as fully inflated.

Figure 4:
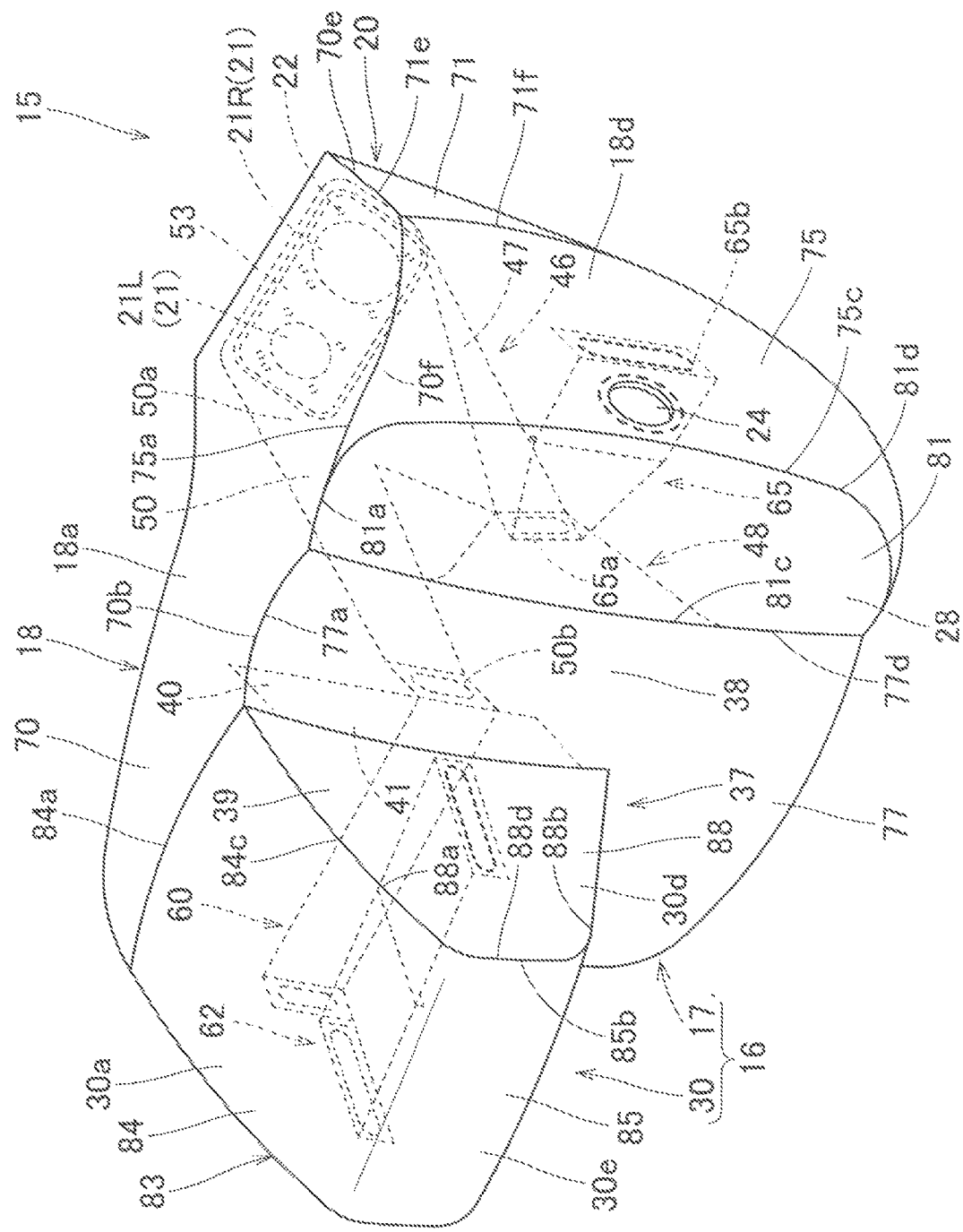
FIG. 4 is a perspective view of the airbag of FIG. 3 as inflated by itself, viewed from right rear above.
Figure 6:
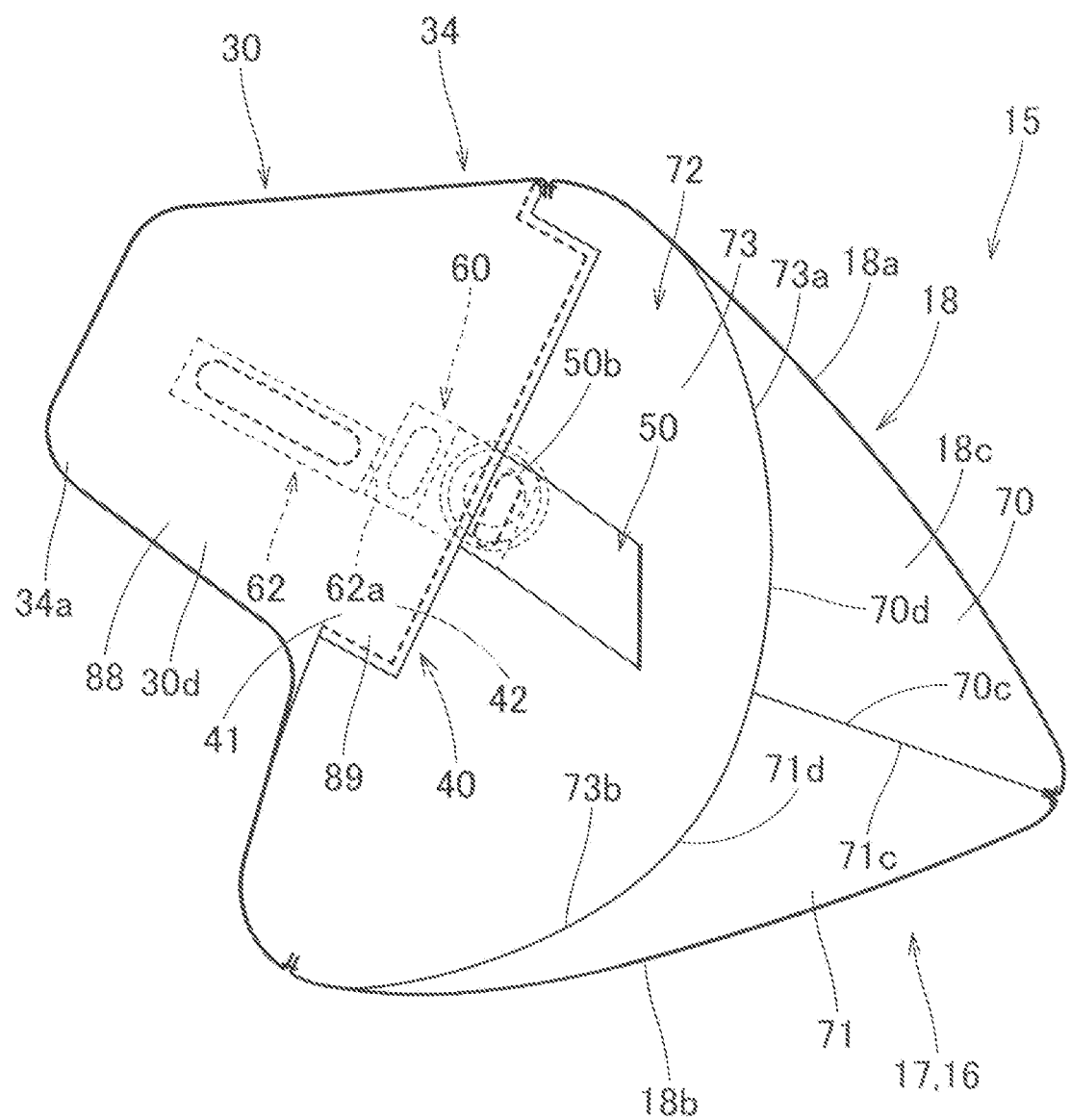
FIG. 6 is a schematic vertical section of the airbag of FIG. 3 taken at the location of an arresting recess.
Figure 7:
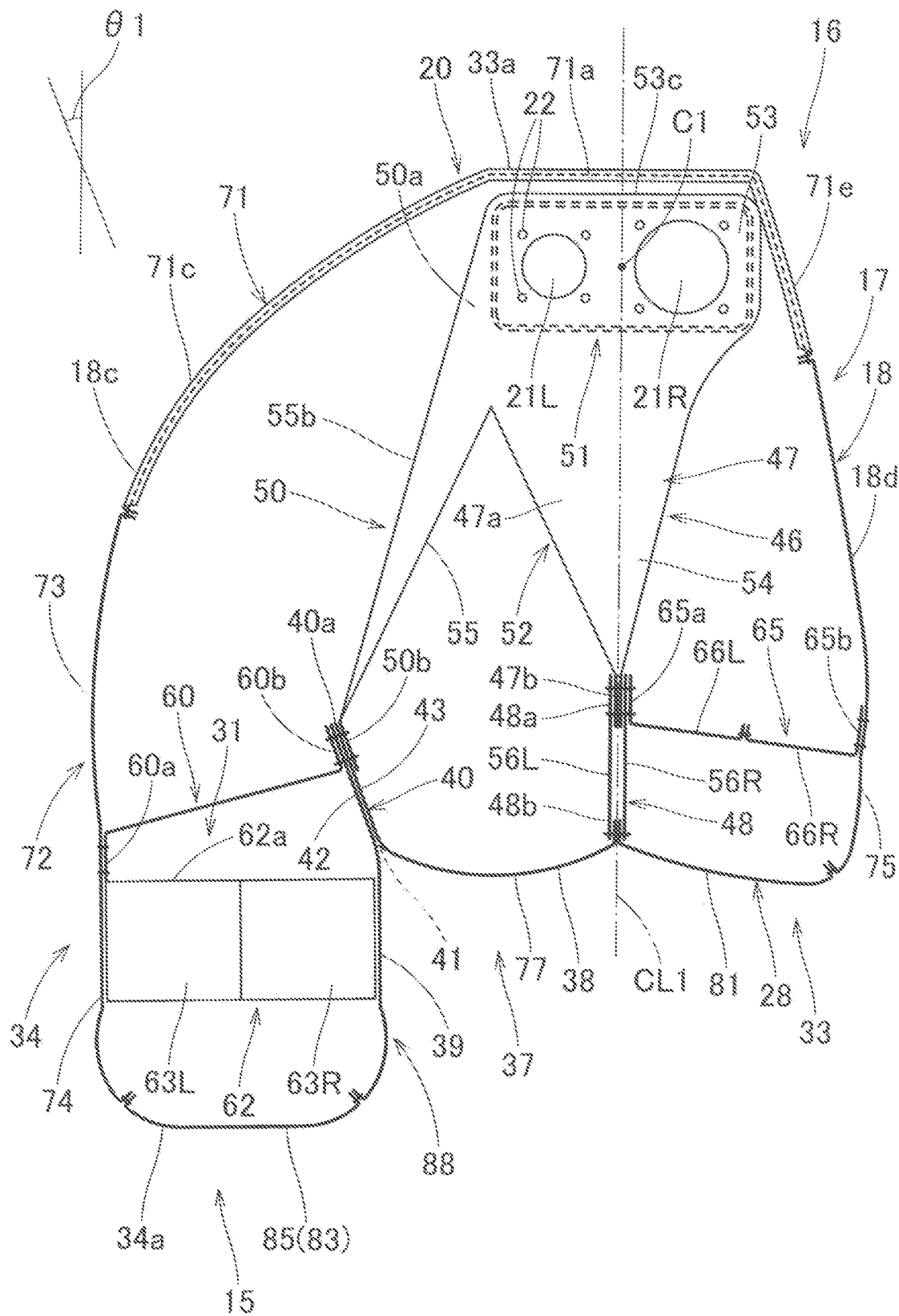
FIG. 7 is a schematic horizontal sectional view of the airbag of FIG. 3.

The bag body 16 is fabricated of a sheet material having flexibility. As shown in FIGS. 4, 6 and 7, the bag body 16 includes a principal inflatable section 17 and a protruding inflatable section 30 which is deployable in such a manner as to protrude rearward out of the rear portion of the principal inflatable section 17.

Figure 2:
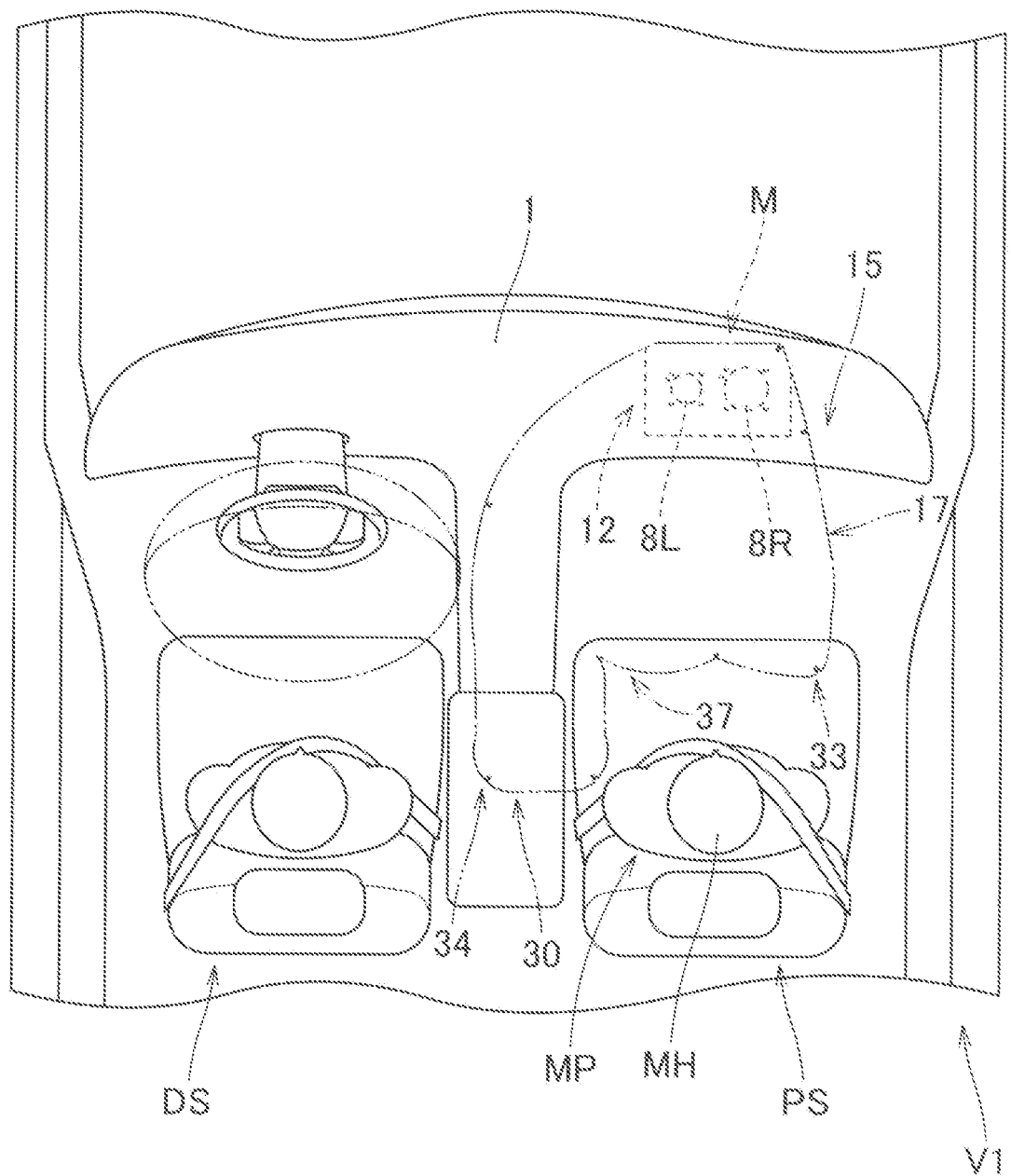
FIG. 2 is a schematic plan view of the airbag device of FIG. 1 as mounted on the vehicle.
Figure 3:
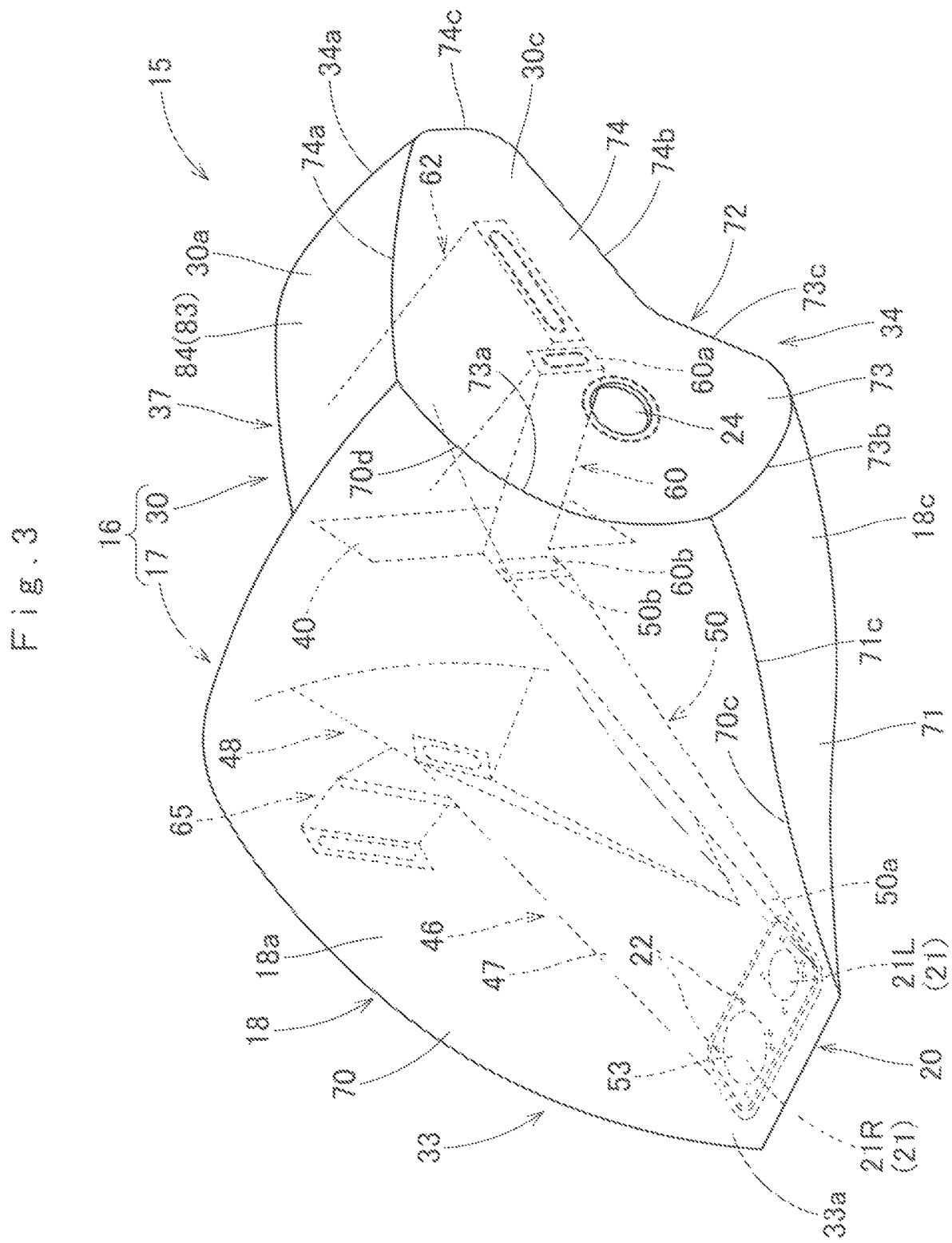
FIG. 3 is a perspective view of an airbag for use in the airbag device of FIG. 1 as inflated by itself, viewed from left front direction.

The principal inflatable section 17 is designed to be so deployed as to fill up a space between the top plane 2 of the dashboard 1 and the windshield 4, as indicated with double-dotted lines in FIG. 1. More specifically, as shown in FIGS. 3 and 4, the outer contour of the principal inflatable section 17 as fully inflated is a generally triangular prism extending in a left and right direction. As shown in FIGS. 3 and 7, the principal inflatable section 17 includes a mounting region 20 at the right front end region as deployed, at which mounting region 20 the principal inflatable section 17 is mounted on the case 12. That is, with the right front end region fixed to the case 12, the principal inflatable section 17 is designed to protrude rearward and towards an inner side in the vehicle width (i.e. towards the left, or towards the driver's seat DS) at airbag deployment, as shown in FIG. 2 (double-dotted lines) and FIG. 13. The principal inflatable section 17 includes a rear side wall 28 which is deployable at the rear to face a passenger MP and a circumferential wall 18 which extends forward from the peripheral edge of the rear side wall 28 while tapering forward in an up and down direction and in a left and right direction.

Figure 5:
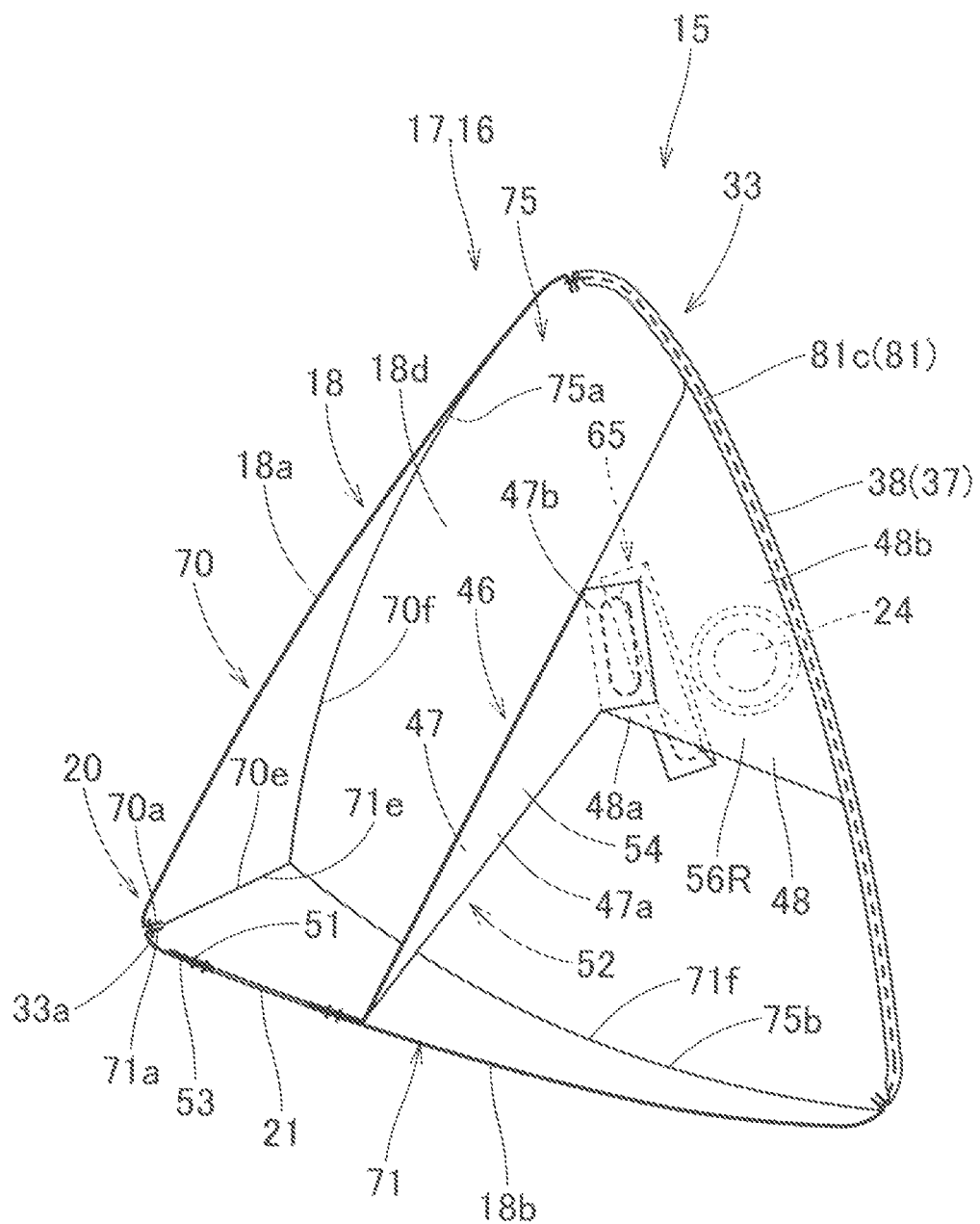
FIG. 5 is a schematic vertical section of the airbag of FIG. 3 taken at the location of a front-rear tether.

The circumferential wall 18 is a portion deployable mainly in such a manner as to fill up the space between the top plane 2 of the dashboard 1 and the windshield 4, and includes an upper wall 18a and a lower wall 18b which are opposed to each other in an up and down direction, and a left side wall 18c and a right side wall 18d which are opposed to each other in a left and right direction. The front region of the left side wall 18c is designed to deploy at a slant with respect to a front and rear direction, in such a manner as to extend rearward and leftward, as shown in FIG. 7. In the airbag 15 of the illustrated embodiment, the front end region of the circumferential wall 18 as deployed serves as the mounting region 20 by which the airbag 15 is mounted on the case 12 (FIGS. 3, 5 and 7). The mounting region 20 is provided, at its lower portion (i.e. on the lower wall 18b), with two gas inlet ports 21 (21L and 21R) for receiving the two inflators 8 (8L and 8R) for introducing an inflation gas. The gas inlet ports 21 are each generally round, and are disposed side by side in a left and right direction. As shown in FIG. 7, the gas inlet port 21L disposed on the left side is smaller in inner diameter than the gas inlet port 21R on the right side so as to correspond to the inflator 8L which is smaller than the inflator 8R. In the periphery of each of the gas inlet ports 21 (21L and 21R) are a plurality of (four, in the illustrated embodiment) mounting holes 22 for receiving the bolts 9a of the retainer 9 which secure the periphery of the gas inlet port 21 to the bottom wall 12a of the case 12. As shown in FIG. 13, in the illustrated embodiment, the airbag 15 is secured to the case 12 and mounted on the vehicle V such that a mounting center C1 (FIG. 7), the center in a left and right direction of the mounting region 20, which is composed of the center of a space between the centers of the gas inlet ports 21L and 21R, coincides with the center in a left and right direction of the front passenger seat PS. A line which runs through the mounting center C1 in a front and rear direction will be called hereinafter a center line CL1. Each of the left side wall 18c and right side wall 18d of the circumferential wall 18 is provided with a vent hole 24 for releasing an extra inflation gas.

As shown in FIG. 7, the principal inflatable section 17 of the illustrated embodiment is so designed as to be inflated farther leftward (i.e. towards the driver's seat DS) than rightward. More particularly, the region disposed on the left side of the center line CL1 at airbag deployment is greater than the region disposed on the right side of the center line CL1.

The rear side wall 28 is deployable generally vertically at the rear to face the front passenger seat PS. The rear side wall 28 of the illustrated embodiment is deployable slightly at a slant relative to an up and down direction, while curving in an up and down direction, such that the lower end protrudes farther rearward than the upper end, as shown in FIG. 1 (double-dotted lines) and in FIG. 5. In a horizontal sectional view of the airbag 15 as deployed, the rear side wall 28 extends generally along a left and right direction, as shown in FIG. 7. The protruding inflatable section 30 is located in an area on the left side of the center in a left and right direction of the rear side wall 28 (i.e. on the left side of the center line CL1) in such a manner as to protrude rearward out of the rear side wall 28. More specifically, the protruding inflatable section 30 is formed at a left upper area of the rear side wall 28 as deployed, thus deployable at an obliquely left front position of the head MH of the passenger MP sitting in the front passenger seat PS, as shown in FIG. 13.

The protruding inflatable section 30 is designed to be inflated into a generally square truncated cone narrowing rearward in an up and down direction. The protruding inflatable section 30 communicates with the principal inflatable section 17 via a communication region 31 located at the front end as deployed, thus fed with an inflation gas from the principal inflatable section 17 via the communication region 31 (FIG. 7). The protruding inflatable section 30 includes an upper wall 30a and a lower wall 30b extending generally along a left and right direction on the upper and lower sides, a left side wall 30c and a right side wall 30d extending generally along a front and rear direction at the left and right sides, and a rear side wall 30e extending generally along an up and down direction at the rear. In the illustrated embodiment, the left side wall 30c is continuous with the left side wall 18c of the circumferential wall 18 of the principal inflatable section 17, as shown in FIG. 7. More particularly, as shown in FIGS. 4, 6 and 7, the protruding inflatable section 30 is generally uniform in width in a left and right direction whereas the upper wall 30a and lower wall 30b draw closer to each other towards the rear. That is, the upper wall 30a and lower wall 30b slant with respect to a front and rear direction. In the illustrated embodiment, the slanting amount of the upper wall 30a with respect to a front and rear direction is greater than that of the lower wall 30b.

As shown in FIG. 7, in a horizontal sectional view of the airbag 15 as deployed, the protruding inflatable section 30 is formed at an area of the airbag 15 on the left side of the center line CL1 which runs through the mounting center C1 in a front and rear direction (in other words, at an area disposed towards the driver's seat DS). More specifically, as viewed from an up and down direction (or in a horizontal sectional view), the protruding inflatable section 30 is designed to be deployed at an area to the left side of the left gas inlet port 21L. Thus the right side wall 30d of the protruding inflatable section 30 is deployed at a farther leftward position than the left gas inlet port 21L.

The bag body 16 of the illustrated embodiment includes a main bag section 33 which is mounted on the case 12 on the front end 33a portion and deployable rearward and a sub bag section 34 which is disposed at least either on a right side or left side of the main bag section 33. The sub bag section 34 of the illustrated embodiment is disposed on the left side of the main bag section 33, in other words, on an inboard side in the vehicle width direction of the main bag section 33. In the illustrated embodiment, the main bag section 33 and sub bag section 34 are integral. More specifically, in the airbag of the illustrated embodiment, the main bag section 33 is composed of a right portion of the principal inflatable section 17 as deployed, including the mounting region 20, (i.e. a portion deployed on the right side of the protruding inflatable section 30), while the sub bag section 34 is composed of a left portion of the principal inflatable section 17 as deployed (i.e. a portion deployed in front of the protruding inflatable section 30) and the protruding inflatable section 30. That is, the main bag section 33 is mounted on the case 12 by the mounting region 20, and the sub bag section 34 is so deployable on the left side of the main bag section 33 that the rear end 34b protrudes farther rearward than the main bag section 33.

In the illustrated embodiment, a rear portion of the airbag 15 as deployed serves as a passenger protection region 37 which protects the front seat passenger MP. More particularly, in the illustrated embodiment, the protruding inflatable section 30, which is part of the sub bag section 34, and the rear side wall 28 of the principal inflatable section 17, part of the main bag section 33, constitute the passenger protection region 37. The passenger protection region 37 includes a front-collision arresting plane 38 which protects the head MH of the passenger MP when it moves forward in the event of a frontal collision of the vehicle V1, and an oblique-collision arresting plane 39 which protects the head MH of the passenger MP when it moves diagonally forward in the event of an oblique collision or an offset collision of the vehicle V1. There is formed an arresting recess 40 between the front-collision arresting plane 38 and the oblique-collision arresting plane 39 for receiving and arresting the head MH of the passenger MP.

In the illustrated embodiment, the front-collision arresting plane 38 is composed of an upper area of the rear side wall 28, i.e. the rear surface of the main bag section 33 as deployed. In other words, the front-collision arresting plane 38 is composed of an area disposed on the right side of the protruding inflatable section 30 as deployed. That is, the front-collision arresting plane 38 includes an area extending farther to the left of the center line CL1 (i.e. towards the driver's seat DS) so as to protect the head MH of the passenger MP smoothly when it moves forward in the event of a frontal collision. As shown in FIGS. 7 and 13, in the horizontal sectional view of the airbag 15 as deployed, the front-collision arresting plane 38 is slightly sunken forward on the center line CL1 or in a vicinity of the center in a left and right direction.

The oblique-collision arresting plane 39 is composed of a side plane of a region of the sub bag section 34 protruding farther rearward than the main bag section 33. That is, the oblique-collision arresting plane 39 is composed of the right side wall 30d of the protruding inflatable section 30 which faces towards the rear side wall 28 of the principal inflatable section 17. That is, the oblique-collision arresting plane 39 is continuous with and rises out of the rear portion (i.e. the rear side wall 28) of the principal inflatable section 17. The oblique-collision arresting plane 39 of the illustrated embodiment is designed to extend generally along a front and rear direction at airbag deployment. The lower region of the rear side wall 28 of the airbag 15 is to catch mainly the thorax of the passenger MP when the passenger protection region 37 arrests the head MH of the passenger MP.

The arresting recess 40 formed between the front-collision arresting plane 38 and oblique-collision arresting plane 39 is provided for catching and arresting the head MH of the passenger MP therein. In the illustrated embodiment, as shown in FIG. 6, the arresting recess 40 is formed generally along an up and down direction at the boundary of the right portion of the protruding inflatable section 30 and the rear side wall 28 of the principal inflatable section 17, in such a manner as to be recessed or dent forward like a pocket having a mouth at the rear end, as shown in FIG. 7. More specifically, the arresting recess 40 is composed of a left side wall 42 and a right side wall 43 each of which has a generally rectangular contour extending in an up and down direction when viewed from a left and right direction. The arresting recess 40 is formed by joining (sewing) together upper edges, lower edges and front edges of the left side wall 42 and right side wall 43, thus has a pocket-like shape opening at the rear end (FIG. 6). That is, the arresting recess 40 has a generally uniform width in an up and down direction from the rear end to the front end (bottom of the recess) 40a. The arresting recess 40 has such a width in an up and down direction at the rear end (at the opening 41) as to admit the passenger's head MH smoothly. More specifically, the width in an up and down direction of the opening 41 of the arresting recess 40 is approximately 400 mm, which is smaller than the width in an up and down direction of the front end portion (or root portion) of the protruding inflatable section 30. The dimension in a front and rear direction (i.e. depth) of the arresting recess 40 is approximately 50 to 100 mm, which is enough to accommodate a front portion of the passenger's head MH. The center in an up and down direction of the arresting recess 40 is generally coincident with that of the protruding inflatable section 30.

In the illustrated embodiment, the airbag 15 is internally provided with a later-described recess-pulling tether 50 which is jointed to the bottom (i.e. the front end 40a) of the arresting recess 40 and pulls the arresting recess 40 forward at airbag deployment, as shown in FIG. 7. The airbag 15 is further internally provided with a regulating tether 60 which connects the bottom (i.e. the front end 40a) of the arresting recess 40 and a vicinity of the front end of the left side wall 30c of the protruding inflatable section 30. At airbag deployment, the arresting recess 40 is pulled forward by the recess-pulling tether 50 while pulled towards the left by the regulating tether 60. The recess-pulling tether 50 and regulating tether 60 help deploy the arresting recess 40 at an angle with respect to a front and rear direction, generally along a moving direction D (FIG. 14) of the passenger's head MH which moves diagonally forward and towards an inboard side (i.e. towards the left), as shown in FIGS. 7 and 13. More specifically, the inclination angle θ1 (FIG. 7) of the arresting recess 40 with respect to a front and rear direction (with respect to the center line CL1 passing through the mounting center C1 and extending along a front and rear direction) is approximately 20 degree (15 to 25 degree) such that the arresting recess 40 is deployed generally along the moving direction D of the passenger's head MH. More specifically, the arresting recess 40 deploys in such a manner as to be continuous with and be recessed forward from the right side wall 30d of the protruding inflatable section 30, and such that the left side wall 42 and right side wall 43 are brought into contact with each other generally wholly and thus the rear end 40b (or the opening 41) is held from gaping open.

As shown in FIGS. 3 to 7, the bag body 16 internally includes tethers 46, 50, 60, 62 and 65. Specifically, the bag body 16 includes a front-rear tether 46 which is disposed in an area of the main bag section 33 in the principal inflatable section 17, the recess-pulling tether 50 which is disposed inside the principal inflatable section 17 for pulling the arresting recess 40 as described above, the regulating tether 60 which is disposed inside the protruding inflatable section 30 for controlling the posture of the arresting recess 40, a left-right tether 62 which is disposed inside the protruding inflatable section 30 and a left-right tether 65 which is disposed inside the principal inflatable section 17.

As shown in FIG. 7, the front-rear tether 46 is designed to deploy on the center line CL1 which passes through the mounting center C1 and extends along a front and rear direction inside the main bag section 33. The front-rear tether 46 is formed by jointing a front section 47 extending from the periphery of the gas inlet ports 21 and a rear section 48 extending from the rear side wall 28, as shown in FIGS. 5 and 7.

Figure 8:
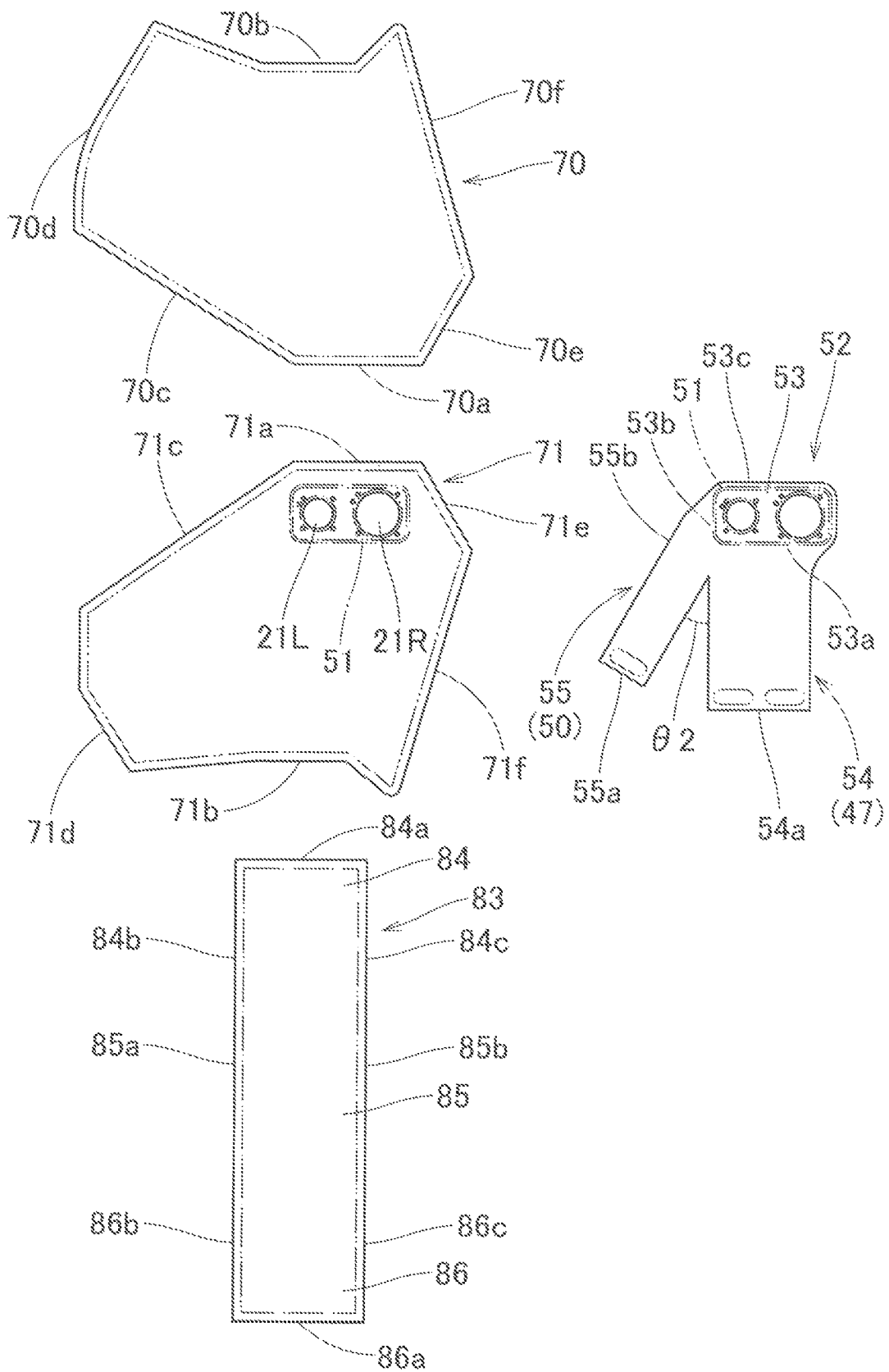
FIGS. 8 and 9 depict base cloths of the airbag of FIG. 3 by plan views.

The front section 47 is formed by folding a front-section forming portion 54 of a base material 52 shown in FIG. 8. The front section 47 is deployable in such a bilaterally symmetric, three dimensional shape approximate to a generally triangular pyramid that the front end extends generally in a left and right direction and the rear end extends generally in an up and down direction. More specifically, as shown in FIGS. 5 and 7, the base material 52 has a mounting base 53 at the front end, and the mounting base 53 is jointed (sewn) to a lower region of the mounting region 20 of the principal inflatable section 17, at the periphery of the gas inlet ports 21. As shown in FIG. 7, the mounting base 53 is jointed to the lower portion (i.e. to the lower wall 18b) of the mounting region 20 by a generally rectangular seam 51, which is formed along a generally entire outer circumference of the mounting base 53. The front-section forming portion 54 of the base material 52 extends rearward from the rear edge 53a of the mounting base 53 and constitutes a main region 47a of the front section 47. The main region 47a is sewn to the front end 48a of the rear section 48 by the rear end 47b, and a width in an up and down direction of the rear end 47b is generally identical to a width in an up and down direction of the front end 48a of the rear section 48.

Figure 9:
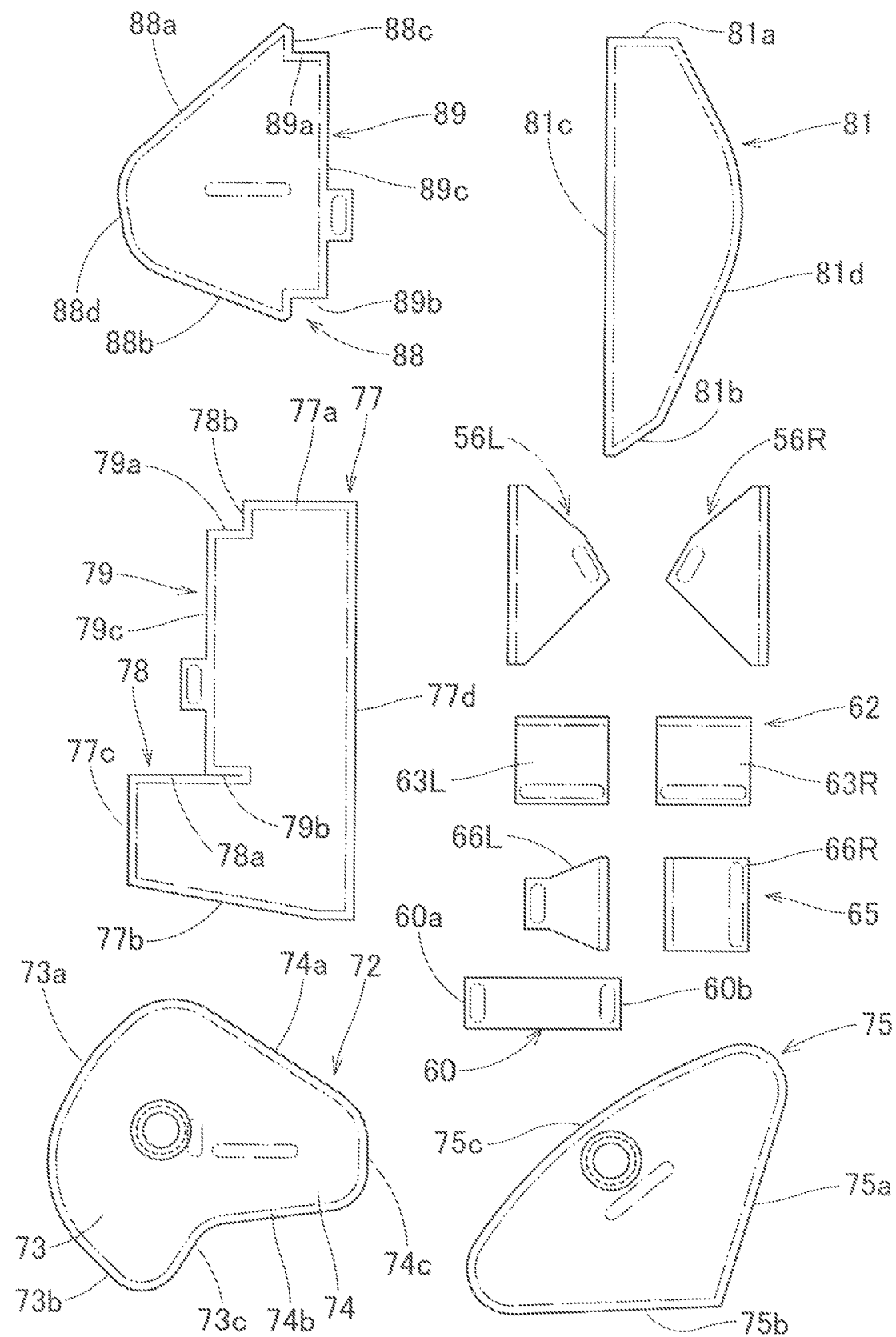

The rear section 48 is designed to extend forward from a region of the rear side wall 28 intersecting with the center line CL1 at airbag deployment. The rear section 48 has a double-wall structure of generally trapezoidal base materials 56L and 56R (FIG. 9). More specifically, the base materials 56L and 56R are jointed to the rear side wall 28 by being each sewn to the inner circumferential edges (77d and 81c) of rear left panel 77 and rear right panel 81 (FIG. 9), when the rear left panel 77 and rear right panel 81 are sewn together by the inner circumferential edges 77d and 81c to form the rear side wall 28 of the principal inflatable section 17, as shown in FIGS. 5 and 7. The rear section 48 (i.e. the base materials 56L and 56R) has such a shape that enlarges toward the rear end 48b in an up and down direction from the front end 48a, which is jointed to the front section 47.

The front-rear tether 46 is provided for limiting a clearance between the periphery of the gas inlet ports 21 and a generally center in a left and right direction of the rear side wall 28 (i.e. of the front-collision arresting plane 38) at airbag deployment in order to prevent the rear side wall 28 from protruding unduly rearward toward the passenger MP in an initial stage of airbag deployment. As shown in FIG. 7, at airbag deployment, the front-rear tether 46 pulls and deploys the rear side wall 28 such that the region on the center line CL1 which passes through the mounting center C1 in a front and rear direction slightly dents forward over a generally entire area in an up and down direction.

The recess-pulling tether 50, which is disposed inside the principal inflatable section 17 for pulling the arresting recess 40, extends forward from the bottom (front end 40a) of the arresting recess 40 and connects the bottom of the arresting recess 40 and the periphery of the gas inlet ports 21, as shown in FIG. 7. The recess-pulling tether 50 of the illustrated embodiment is composed of a tether portion 55 of the base material 52 (FIG. 8). The tether portion 55 shares the mounting base 53 of the base material 52 with the front-rear tether 46. In the base material 52, the tether portion 55 is formed generally into a band and extends from an edge region of the mounting base 53 adjoining the front-rear tether 46 (front-section forming portion 54), while drawing away from the front-section forming portion 54. In the illustrated embodiment, the tether portion 55 extends from the left edge 53b of the mounting base 53, which left edge 53b adjoins the rear edge 53a and is generally orthogonal to the rear edge 53a. More specifically, as shown in FIG. 8, the tether portion 55 extends at a slant with respect to a front and rear direction from the left edge 53b of the mounting base 53. The left edge 55b of the tether portion 55, which is disposed towards the sub bag section 34, extends from the front edge 53c of the mounting base 53, and the rear end 55a of the tether portion 55 is separated from the rear end 54a of the front-section forming portion 54 towards the left. In the illustrated embodiment, an inclination angle θ2 (FIG. 8) of the tether portion 55 with respect to the front-section forming portion 54 is approximately 30 degree. When the airbag device M is mounted on board, the mounting base 53 of the recess-pulling tether 50 is jointed to the case 12 together with the main bag section 33 through the use of the retainer (mounting member) 9. Accordingly, at airbag deployment, the recess-pulling tether 50 is bent at a vicinity of the left edge 9b of the retainer (i.e. mounting member) 9 and is deployed such that the width extends in an up and down direction, as shown in FIG. 15. The recess-pulling tether 50 has such a length that does not hinder the function of the regulating tether 60 and is capable of deploying the arresting recess 40 in such a fashion that the left side wall 42 and right side wall 43 of the arresting recess 40 are brought into contact with each other generally wholly and the rear end 40b (or the opening 41) is held from gaping open, when pulling the bottom or front end 40a of the arresting recess 40 forward. A fine adjustment of the posture of the arresting recess 40 at airbag deployment can be made by changing the inclination angle of the tether portion 55 for forming the recess-pulling tether 50 with respect to the front-section forming portion 54, or changing the length of the tether portion 55.

The regulating tether 60 is disposed inside the protruding inflatable section 30 for helping deploy the arresting recess 40 generally along the moving direction D of the passenger's head MH, which moves diagonally forward, at airbag deployment. The regulating tether 60 connects the bottom (front end 40a) of the arresting recess 40 and a side plane of the sub bag section 34 which is opposed to the oblique-collision arresting plane 39 in a left and right direction (i.e. the left side wall 30c of the protruding inflatable section 30). In the illustrated embodiment, the left end 60a of the regulating tether 60 is jointed to a vicinity of the front end of the protruding inflatable section 30, and the right end 60b is jointed to the bottom (front end 40a) of the arresting recess 40. As shown in FIG. 7, when viewed from an up and down direction, the regulating tether 60 is disposed at a slant with respect to a left and right direction such that the left end 60a is disposed farther rearward than the right end 60b at airbag deployment. The regulating tether 60 has such a length that is capable of pulling the arresting recess 40 forward and deploying the arresting recess 40 at a slant with respect to a front and rear direction with the front end 40a directed towards the left, in cooperation with the recess-pulling tether 50.

As shown in FIG. 7, the left-right tether 62 is disposed generally along a left and right direction inside the protruding inflatable section 30 and connects the left side wall 30c and right side wall 30d of the protruding inflatable section 30. The left-right tether 62 of the illustrated embodiment is disposed such that the width direction extends generally along a front and rear direction. More specifically, the left-right tether 62 is disposed slightly below the center in an up and down direction of the protruding inflatable section 30 as inflated, in an area the protruding inflatable section 30 has a greatest width in a front and rear direction. The width in a front and rear direction of the left-right tether 62 is approximately three fifths of the area that the protruding inflatable section 30 has the greatest width in a front and rear direction. The left-right tether 62 is so disposed that the front end 62a is located proximate to the front end of the protruding inflatable section 30, as shown in FIGS. 6 and 7. The left-right tether 62 of the illustrated embodiment is composed by joining together two base cloths 63L and 63R disposed side by side in a left and right direction. The left-right tether 62 limits a clearance between the left side wall 30c and right side wall 30d of the protruding inflatable section 30 and helps deploy the right side wall 30d (i.e. the oblique-collision arresting plane 39) generally along a front and rear direction at airbag deployment.

As shown in FIG. 7, the left-right tether 65 connects the central region in a front and rear direction of the front-rear tether 46 and the central region in a front and rear direction of the right side wall 18d of the principal inflatable section 17 (i.e. the side plane of the main bag section 33 disposed away from the oblique-collision arresting plane 39) inside the principal inflatable section 17. More specifically, the left end 65a of the left-right tether 65 is jointed to a vicinity of the joint of the front section 47 and rear section 48 of the front-rear tether 46, and the right end 65b is jointed to a position slightly at the rear of the center in a front and rear direction of the right side wall 18d. The left-right tether 65 deploys generally along a left and right direction at airbag deployment. More particularly, the left-right tether 65 of the illustrated embodiment is designed to deploy at a slight slant with respect to a left and right direction such that the right end 65b is disposed slightly farther rearward than the left end 65b, as viewed from above or below the airbag 15 as deployed. In the illustrated embodiment, the left-right tether 65 is formed by joining together two base cloths 66L and 66R disposed side by side in a left and right direction. The left-right tether 65 limits a clearance between the front-rear tether 46 and right side wall 18d and prevents the principal inflatable section 17 from bulging in a left and right direction unduly in an initial state of airbag deployment.

The bag body 16 is formed by sewing together circumferential edges of predetermined shaped base cloths. In the illustrated embodiment, as shown in FIGS. 8 and 9, the bag body 16 is composed of eight base cloths; an upper panel 70 deployable on the upper side, a lower panel 71 deployable on the lower side, a left panel 72 deployable on the left side, a right panel 75 deployable on the right side, a rear left panel 77 and a rear right panel 81 which are deployable on the rear side, a protruding-section main panel 83 which constitutes the upper region, the rear region and the lower region of the protruding inflatable section 30, and a protruding-section right panel 88 which constitutes the right region of the protruding inflatable section 30.

The upper panel 70 forms the upper wall 18a of the principal inflatable section 17 and an upper front area of the left side wall 18c. The lower panel 71 forms the lower wall 18b of the principal inflatable section 17 and a lower front area of the left side wall 18c. The upper panel 70 and lower panel 71 are generally identical in outer contour.

The left panel 72 forms a rear region of the left side wall 18c of the principal inflatable section 17 and the left side wall 30c of the protruding inflatable section 30. As shown in FIG. 9, the left panel 72 includes a generally triangular main body 73 for forming the rear region of the left side wall 18c and a tapering, generally trapezoidal protruding region 74 disposed at the rear upper end of the main body 73 for forming the left side wall 30c of the protruding inflatable section 30. The right panel 75 forms the right side wall 18d of the principal inflatable section 17, and is generally triangular in outer contour.

The rear left panel 77 and the rear right panel 81 each form a left half region and a right half region of the rear side wall 28 of the principal inflatable section 17 as deployed. In the illustrated embodiment, the rear left panel 77 constitutes the region of the rear side wall 28 which is disposed on the left side of the center line CL1 which runs through the mounting center C1 and extends generally along a front and rear direction. The rear right panel 81 forms the region of the rear side wall 28 on the right side of the center line CL1 (FIG. 7). The rear left panel 77 has such a contour that the left upper region is cut out for providing gas communication between the principal inflatable section 17 and protruding inflatable section 30. As shown in FIG. 9, a flap-like portion 79 is disposed in this cut-out region 78 for forming the right side wall 43 of the arresting recess 40. The flap-like portion 79 is formed into a generally rectangle elongated in an up and down direction and protrudes towards the left out of the right edge of the cut-out region 78 of the rear left panel 77 as developed flatly. More specifically, the width in an up and down direction of the flap-like portion 79 is slightly smaller than that of the cut-out region 78 (i.e., the length of the right edge of the cut-out region 78). The rear right panel 81 has a generally semielliptical shape elongated generally in an up and down direction. The rear left panel 77 and rear right panel 81 are sewn together on the inner circumferential edges (i.e. on the right edge 77d and left edge 81c) to form the rear side wall 28. The rear ends of the base materials 56L and 56R for forming the rear section 48 of the front-rear tether 46 are sewn together with the inner circumferential edges 77d and 81c of the rear left panel 77 and rear right panel 81, thus the rear section 48 of the front-rear tether 46 is jointed to the rear side wall 28.

The protruding-section main panel 83 includes an upper-wall region 84 for forming the upper wall 30a, a rear-wall region 85 for forming the rear side wall 30e, and a lower-wall region 86 for forming the lower wall 30b, of the protruding inflatable section 30 as deployed. The protruding-section main panel 83 has such a generally band-shaped outer contour that the upper-wall region 84, the rear-wall region 85 and the lower-wall region 86 are lined up.

The protruding-section right panel 88 forms the right side wall 30d of the protruding inflatable section 30 as deployed, and is formed into a generally trapezoid slightly narrowing towards the rear edge 88a. A flap-like portion 89 for forming the left side wall 42 of the arresting recess 40 is disposed at the front edge 88c of the protruding-section right panel 88. The flap-like portion 89 is formed into a generally rectangle and protrudes out of the front edge 88c of the protruding-section right panel 88. The flap-like portion 89 is generally identical in outer contour to the flap-like portion 79 of the rear left panel 77, as shown in FIG. 9. More specifically, the width in an up and down direction of the flap-like portion 89 is slightly smaller than that of the front edge 88c of the protruding-section right panel 88, and the center in an up and down direction of the flap-like portion 89 generally coincides with the center in an up and down direction of the front edge 88c of the protruding-section right panel 88.

In the illustrated embodiment, components of the bag body 16, i.e., the upper panel 70, lower panel 71, left panel 72, right panel 75, rear left panel 77, rear right panel 81, protruding-section main panel 83, protruding-section right panel 88, base material 52 for forming the front section 47 of the front-rear tether 46 and recess-pulling tether 50, base materials 56L and 56R for forming the rear section 48 of the front-rear tether 46, regulating tether 60, the base cloths 63L and 63R of the left-right tether 62, base materials 66L and 66R for forming the left-right tether 65, are made of a flexible woven fabric of polyester yarn, polyamide yarn or the like.

As shown in FIGS. 3 to 7, the bag body 16 of the illustrated embodiment is formed by sewing (jointing) corresponding circumferential edges of the upper panel 70, lower panel 71, left panel 72, right panel 75, rear left panel 77, rear right panel 81, protruding-section main panel 83, and protruding-section right panel 88 together with sewing threads. More specifically, the front edge 70a, left front edge 70c and right front edge 70e of the upper panel 70 are jointed with the front edge 71a, left front edge 71c and right front edge 71e of the lower panel 71. The rear edge 70b of the upper panel 70 is jointed with the front edge 84a of the upper-wall region 84 of the protruding-section main panel 83, the upper edge 77a of the rear left panel 77 and the upper edge 81a of the rear right panel 81. The left rear edge 70d of the upper panel 70 is jointed with the upper edge 73a of the body region 73 of the left panel 72. The right rear edge 70f of the upper panel 70 is jointed with the upper edge 75a of the right panel 75. The rear edge 71b of the lower panel 71 is jointed with the lower edges 77b and 81b of the rear left panel 77 and rear right panel 81. The left rear edge 71d of the lower panel 71 is jointed with the lower edge 73b of the body region 73 of the left panel 72. The right rear edge 71f of the lower panel 71 is jointed with the lower edge 75b of the right panel 75. The rear edge 73c of the body region 73 of the left panel 72 is jointed with the left edge 77c of the rear left panel 77. The upper edge 74a of the protruding region 74 of the left panel 72 is jointed with the left edge 84b of the upper-wall region 84 of the protruding-section main panel 83, the rear edge 74c is jointed with the left edge 85a of the rear-wall region 85 of the protruding-section main panel 83, and the lower edge 74b is jointed with the left edge 86b of the lower-wall region 86. The rear edge 75c of the right panel 75 is jointed with the right edge 81d of the rear right panel 81. The right edge or inner circumferential edge 77d of the rear left panel 77 is jointed with the left edge or inner circumferential edge 81c of the rear right panel 81. As described above, the rear ends of the base materials 56L and 56R for forming the rear section 48 of the front-rear tether 46 are sewn together with the inner circumferential edges 77d and 81c of the rear left panel 77 and rear right panel 81, thus the rear section 48 of the front-rear tether 46 is jointed to the rear side wall 28. The lower edge 78a of the cut-out region 78 of the rear left panel 77 is jointed with the front edge 86a of the lower-wall region 86 of the protruding-section main panel 83. The right edge 78b of the cut-out region 78 of the rear left panel 77 is jointed with the front edge 88c of the protruding-section right panel 88. The upper edge 79a, lower edge 79b and front edge 79c of the flap-like portion 79 of the rear left panel 77 are each jointed with the upper edge 89a, lower edge 89b and front edge 89c of the flap-like portion 89 of the protruding-section right panel 88. The right edge 84c of the upper-wall region 84, the right edge 85b of the rear-wall region 85 and the right edge 86c of the lower-wall region 86 of the protruding-section main panel 83 are each jointed with the upper edge 88a, lower edge 88b and rear edge 88c of the protruding-section right panel 88.

Figure 10A:
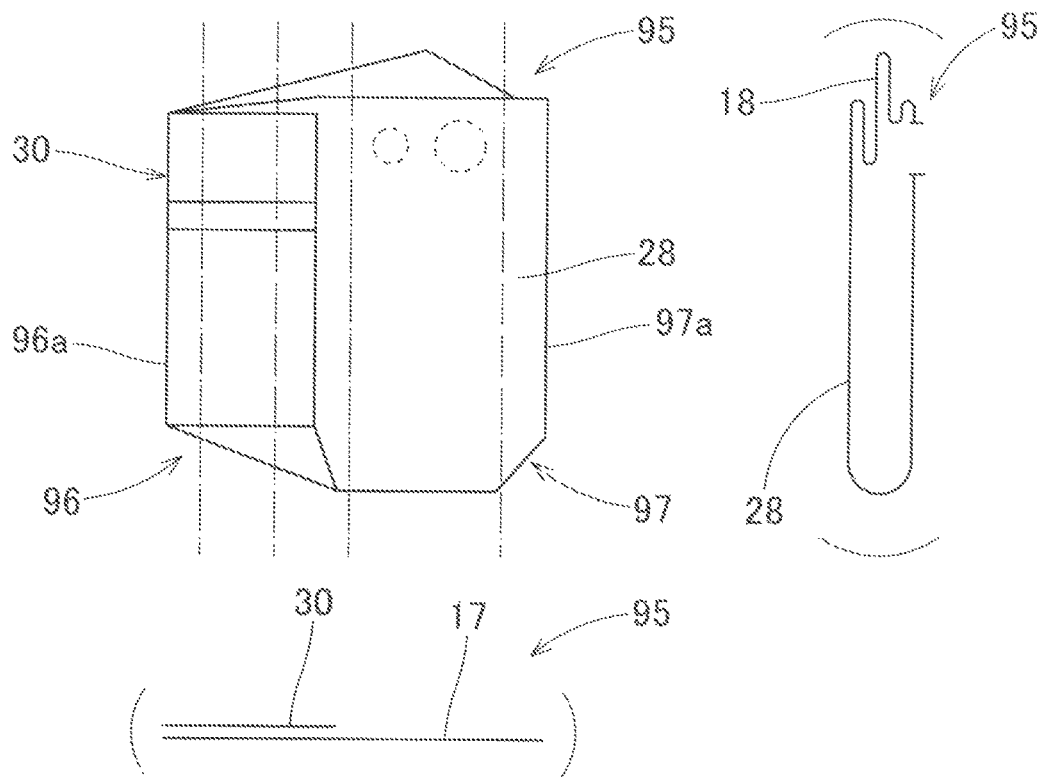
FIGS. 10A, 10B, 11A, 11B, 11C and 11D illustrate the folding process of the airbag of FIG. 3.
Figure 10B:
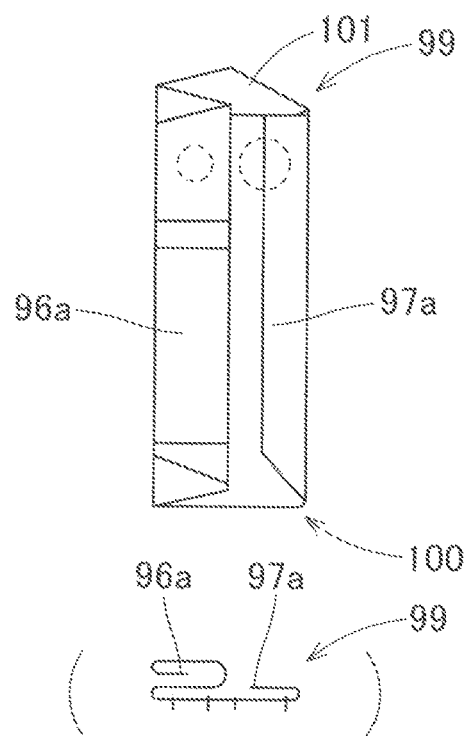
Figure 11A:
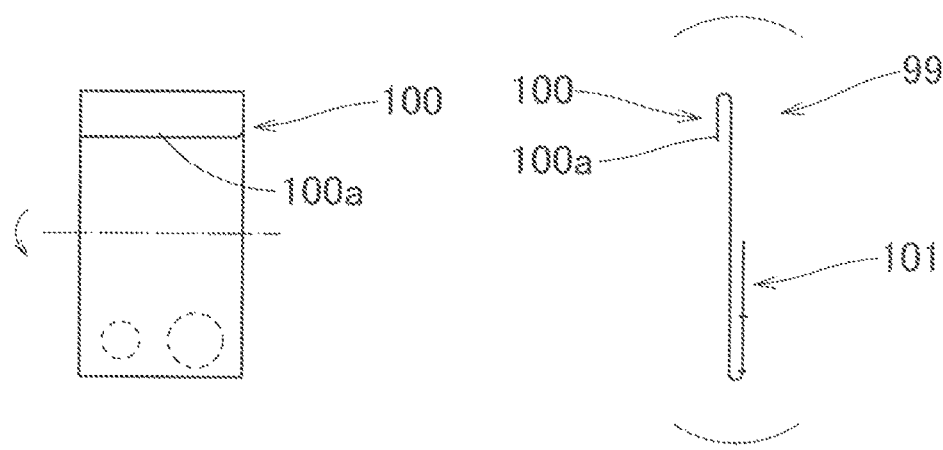
Figure 11B:
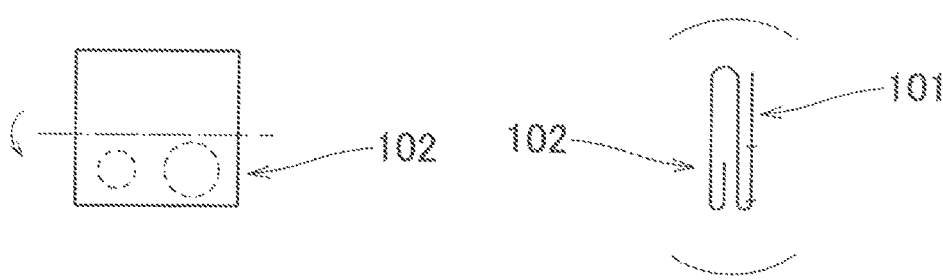
Figure 11C:
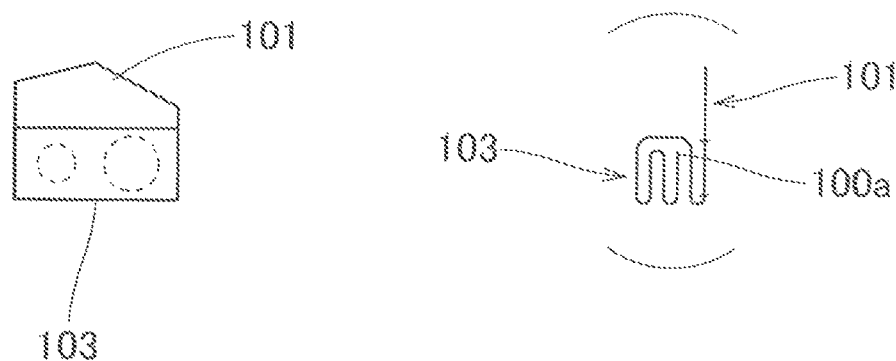
Figure 11D:
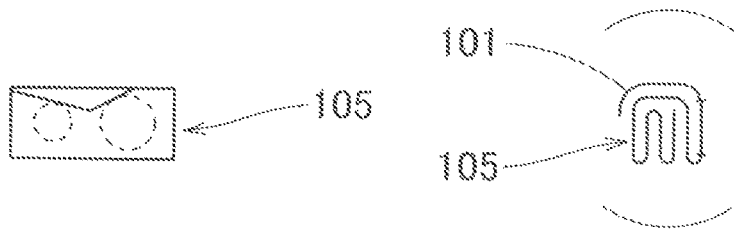

Mounting of the airbag device M on the vehicle V1 is now described. Firstly, the retainer 9 is housed inside the airbag 15 such that the bolts 9a protrude out of the mounting holes 22. Then the airbag 15 is folded up to be housed in the case 12. The folding process of the airbag 15 includes a preliminary folding step, a left-right contraction step and a front-rear contraction step. Referring to FIG. 10A, in the preliminary folding step, the airbag 15 is folded making a crease on the circumferential wall 18 such that the rear side wall 28 is generally flattened and brought closer to the gas inlet ports 21. The protruding inflatable section 30 is folded up and placed on the rear side wall 28. The airbag 15 in this stage (shown in FIG. 10A) will be called herein after a preliminarily-folded airbag 95. The preliminarily-folded airbag 95 is then subjected to the left-right contraction step in which the airbag 95 is contracted in width in a left and right direction to an extent to fit in the case 12. Specifically, referring to FIGS. 10A and 10B, the left portion 96 of the preliminarily-folded airbag 95 (i.e. the portion disposed to the left of the gas inlet ports 21) is rolled, from the left edge 96a, towards the gas inlet ports 21, on the circumferential wall 18, and the rolled portion is turned and placed on the rear side wall 28. In the mean time, the right portion 97 (i.e. the portion disposed to the right of the gas inlet ports 21) is folded on a crease which extends generally along a front and rear direction such that the right edge 97a is placed on the rear side wall 28 (on a side facing away from the gas inlet ports 21). The left-right contraction provides an airbag shown in FIG. 10B, which will herein after be called a left-right contracted airbag 99. The left-right contracted airbag 99 is subsequently subjected to the front-rear contraction step. Specifically, referring to FIGS. 10B and 11A, the rear portion 100 of the left-right contracted airbag 99 (i.e. the portion disposed at the rear of the gas inlet ports 21) is turned at a vicinity of the rear edges of the gas inlet ports 21, then the rear end 100a is turned towards a side facing away from the gas inlet ports 21. As shown in FIG. 11B, the rear portion 100 is then doubled, thus providing a doubled portion 102. The doubled portion 102 is doubled again, and a bellows-folded portion 103 is formed as shown in FIG. 11C. At this point, the rear end 100a of the rear portion 100 is disposed close to the gas inlet ports 21. Then the front portion 101, the portion disposed in front of the gas inlet ports 21, is placed over the bellows-folded portion 103, thus completing the folding process of the airbag 15. The airbag 15 is contracted in size in a front and rear direction as well as in a left and right direction so as to fit in the case 12.

Thereafter a breakable wrapping sheet is wrapped around the folded-up airbag 15 for keeping the folded-up configuration. Then the airbag 15 is placed on the bottom wall 12a of the case 12, and the main bodies 8a of the inflators 8L and 8R are set in the case 12 from the lower side of the bottom wall 12a, such that the bolts 9a of the retainer 9 projecting downwardly out of the bottom wall 12a go through the flanges 8c of the inflators 8. If then the bolts 9a projecting out of the flanges 8c of the inflators 8L and 8R are fastened with nuts 10, the airbag 15 and the inflators 8L and 8R are mounted on the bottom wall 12a of the case 12. At this time, the mounting base 53 of the front-rear tether 46 and recess-pulling tether 50 is mounted on the case 12 together with the bag body 16 (main bag section 33) with the aid of the retainer 9.

Thereafter, the circumferential wall 12b of the case 12 is attached to the joint wall 6c of the airbag cover 6 on the dashboard 1, which has been mounted on board, and the unillustrated bracket of the case 12 is secured to the vehicle body structure. Thus the airbag device M is mounted on the vehicle V1.

The airbag device M of the foregoing embodiment includes the recess-pulling tether 50 which is jointed to the bottom (or front end 40a) of the arresting recess 40 and the front-rear tether 46 which is deployable generally along a front and rear direction inside the main bag section 33 for preventing the front-collision arresting plane 38 from moving rearward. The recess-pulling tether 50 and front-rear tether 46 are configured to bifurcate out of the mounting base 53 and share the mounting base 53, such that both of them are mounted on the main bag section 33 by the mounting base 53. Further, the mounting base 53 is mounted on the case (i.e. housing) 12 through the use of the retainer (i.e. mounting member) 9 together with the main bag section 33. That is, the recess-pulling tether 50 is configured to extend from a position dislocated from the front-rear tether 46 in a left and right direction towards the sub bag section 34, thus not overlapping with the front-rear tether 46. In the illustrated embodiment, the recess-pulling tether 50 extends from the left side of the front-rear tether 46. With this configuration, the recess-pulling tether 50 is deployed generally along a front and rear direction, with little inclination with respect to a front and rear direction, thus is capable of pulling the arresting recess 40 forward forcefully at the position dislocated from the front-rear tether 46. Accordingly, in an initial stage of airbag deployment, the recess-pulling tether 50 and front-rear tether 46 will prevent an extensive area in a left and right direction of the main bag section 33 and sub bag section 34 from protruding rearward unduly out of the case 12, and further prevent the airbag 15 from bouncing back forward thereafter. That is, even without an outer tether, the configuration of the illustrated embodiment is capable of preventing the airbag 15 including the sub bag section 34 from oscillating in a front and rear direction repeatedly during deployment.

Figure 12:
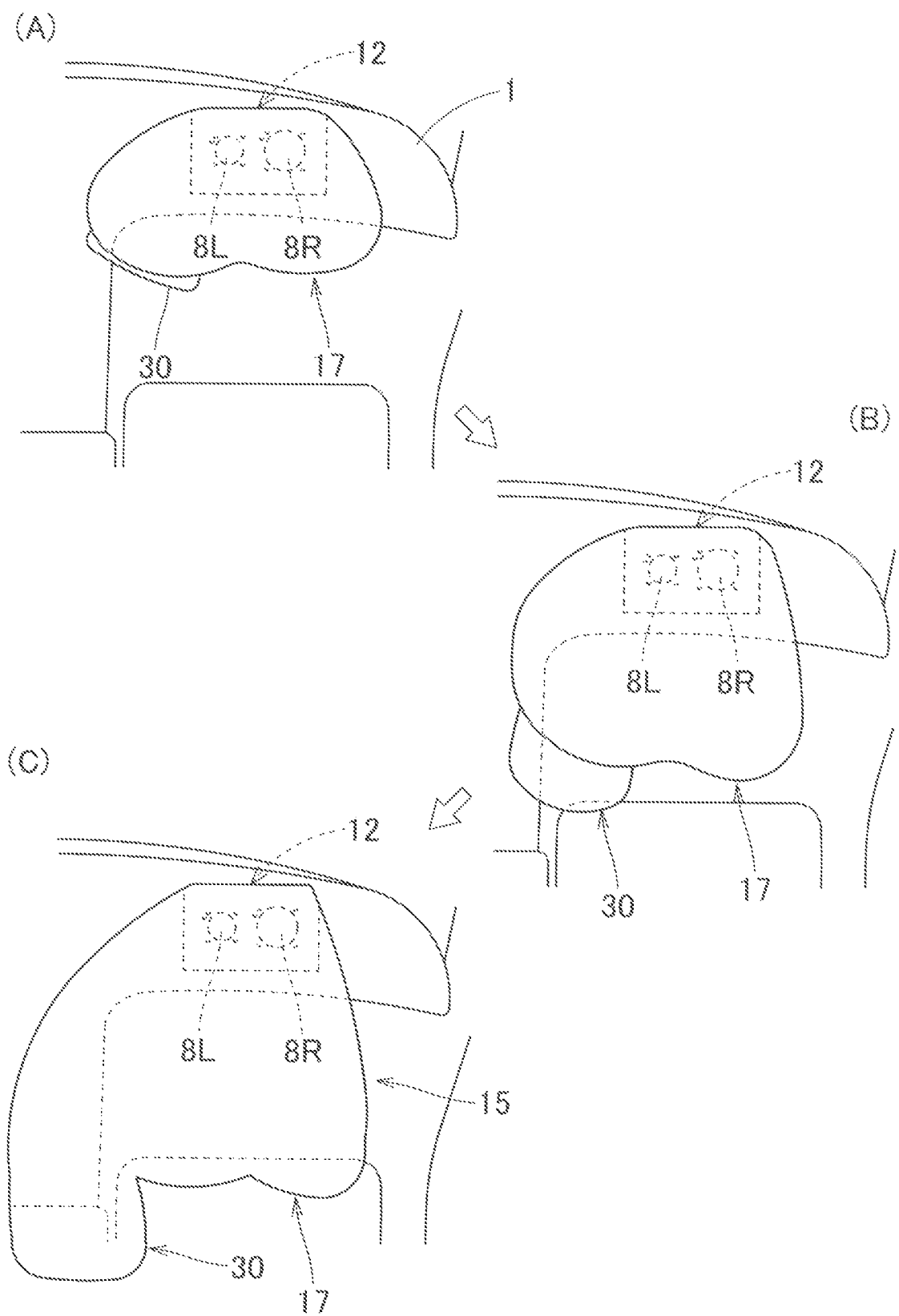
FIG. 12 illustrates the behavior of the airbag of FIG. 3 at deployment by schematic plan views.

More specifically, when the airbag 15 of the illustrated embodiment is fed with an inflation gas, the principal inflatable section 17 firstly undoes the folds formed in the front-rear contraction step and left-right contraction step described above and thus unfolds in front, rear, left and right directions, as shown in (A) of FIG. 12. Especially in the illustrated embodiment, the front-rear contraction step is composed of bellows-folding, and the left-right contraction step is composed of rolling in the left portion 96 and bellows-folding in the right portion 97, of the preliminarily-folded airbag 95. Therefore, the bellows-folding of the front-rear contraction step is quickly undone first, such that the airbag 15 unfolds in a front and rear direction, and generally simultaneously, the bellows-folding in the right portion 97 of the preliminarily-folded airbag 95 (i.e. the rear side wall 28 of the principal inflatable section 17) is undone quickly. Subsequently, the protruding inflatable section 30, which has been rolled, unrolls and admits an inflation gas therein via the communication region 31, and inflates as shown in (B) and (C) of FIG. 12. At this time, the recess-pulling tether 50 and front-rear tether 46 hold the principal inflatable section 17 and protruding inflatable section 30 from protruding out of the case 12 in an undue fashion and help deploy the principal inflatable section 17 and protruding inflatable section 30 in a desired outer contour quickly, as shown in (C) of FIG. 12. As a consequence, the airbag 15 of the airbag device M of the illustrated embodiment reaches the desired outer contour as deployed quickly.

Especially, the airbag device M of the illustrated embodiment includes, inside the main bag section 33, the left-right tether 65 which connects the central region in a front and rear direction of the front-rear tether 46 and the central region in a front and rear direction of the right side wall 18*d* of the principal inflatable section 17 (the side plane of the main bag section 33 disposed apart from the oblique-collision arresting plane 39). The left-right tether 65 is capable of preventing the principal inflatable section 17 from bulging in a left and right direction too much, thus suppressing an oscillation of the airbag 15 in the initial stage of airbag deployment.

Moreover, the recess-pulling tether 50 and front-rear tether 46 are both disposed inside the airbag 15 and both mounted on the case 12 by the shared mounting base 53, with only one retainer 9. This will simplify the configuration of the airbag 15 and mounting work on the case 12, and reduce of the workload and cost in manufacturing of the airbag 15.

Therefore, the airbag device M for a front passenger seat of the embodiment is capable of deploying the airbag 15 quickly with a simple configuration, by suppressing the airbag from oscillating in a front and rear direction during deployment.

In the airbag device M of the illustrated embodiment, moreover, the arresting recess 40 is disposed between the front-collision arresting plane 38 and oblique-collision arresting plane 39 for receiving and arresting the head MH of the passenger MP. Since the recess-pulling tether 50 keeps the arresting recess 40 recessed or dented during airbag deployment, the arresting recess 40 will smoothly receive and arrest the passenger's head MH, which has been guided by the oblique-collision arresting plane 39, in the event of an oblique collision or an offset collision of the vehicle V1.

Figure 14:
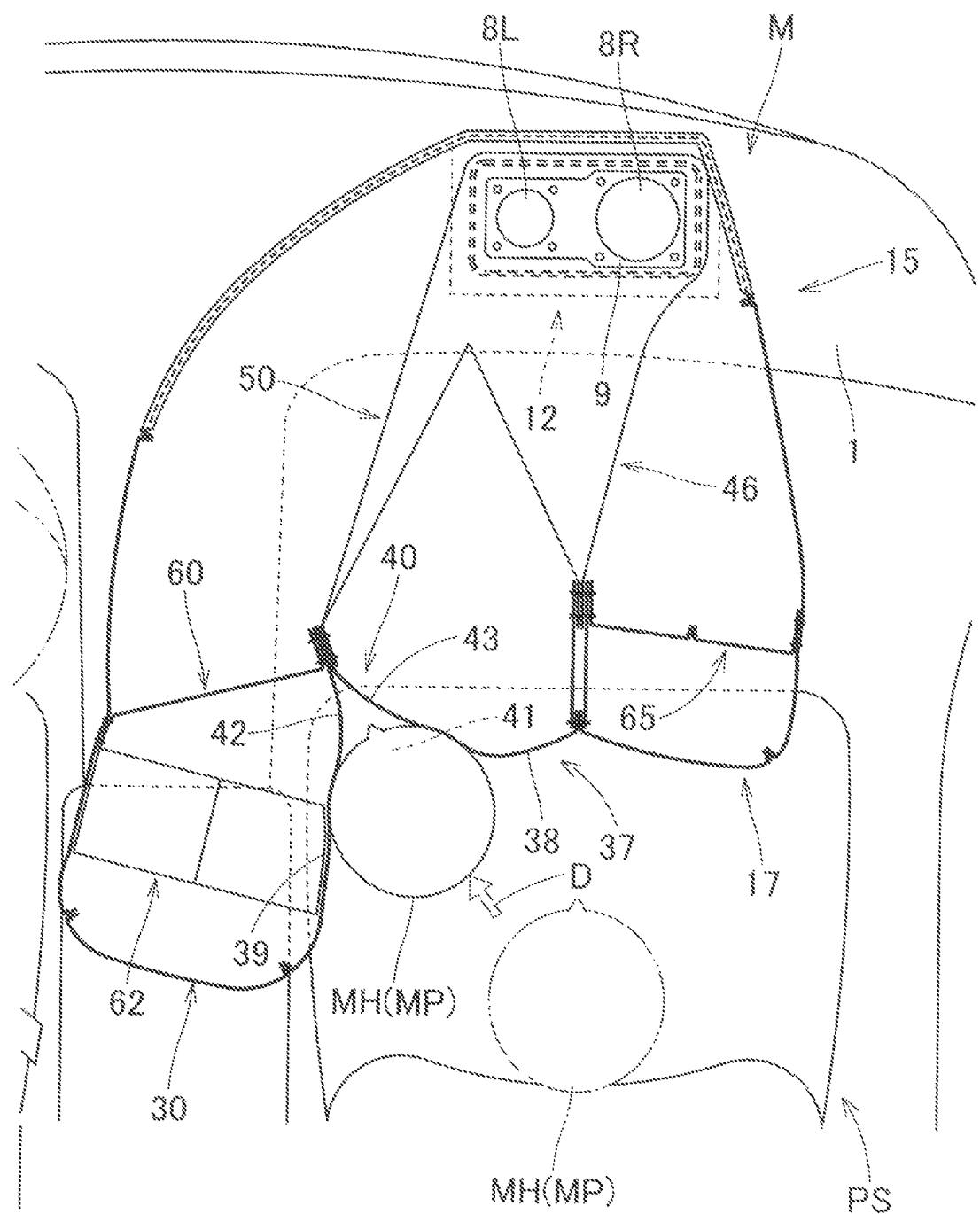
FIG. 14 is a schematic horizontal sectional view of the airbag device of FIG. 1 showing the airbag as completed deployment and caught a passenger who has moved diagonally.

Moreover, the airbag 15 internally includes the regulating tether 60 which helps deploy the arresting recess 40 generally along a moving direction D of the passenger's head MH which moves diagonally forward. With the regulating tether 60, at airbag deployment, the passenger's head MH, which has moved diagonally forward, will enter into the arresting recess 40 disposed generally along the moving direction of the head MH, as shown in FIGS. 13 and 14, and accordingly, the head MH will be prevented from being engaged with only either one of the inner surfaces (the left side wall 42 or right side wall 43) of the arresting recess 40. As a consequence, the arresting recess 40 will catch the head MH of the passenger MP in a balanced fashion with the inner surfaces (the left side wall 42 or right side wall 43), without turning the head MH sideways. If such an advantageous effect does not have to be considered, the airbag may be configured, with no such regulating tether, such that the arresting recess is pulled forward only by the recess-pulling tether.

Furthermore, in the airbag device M of the illustrated embodiment, the recess-pulling tether 50 (i.e. the tether portion 55 of the base material 52) is configured such that the left edge 55*b* (the edge in a width direction facing towards the sub bag section 34) extends from the front edge 53*c* region of the mounting base 53. This configuration further helps reduce the inclination of the recess-pulling tether 50 with respect to a front and rear direction at airbag deployment, thus enabling the recess-pulling tether 50 to pull the arresting recess 40 forward further forcefully. If such an advantageous effect does not have to be considered, the left edge of the recess-pulling tether may be configured to extend from the rear edge region of the mounting base.

Figure 18:
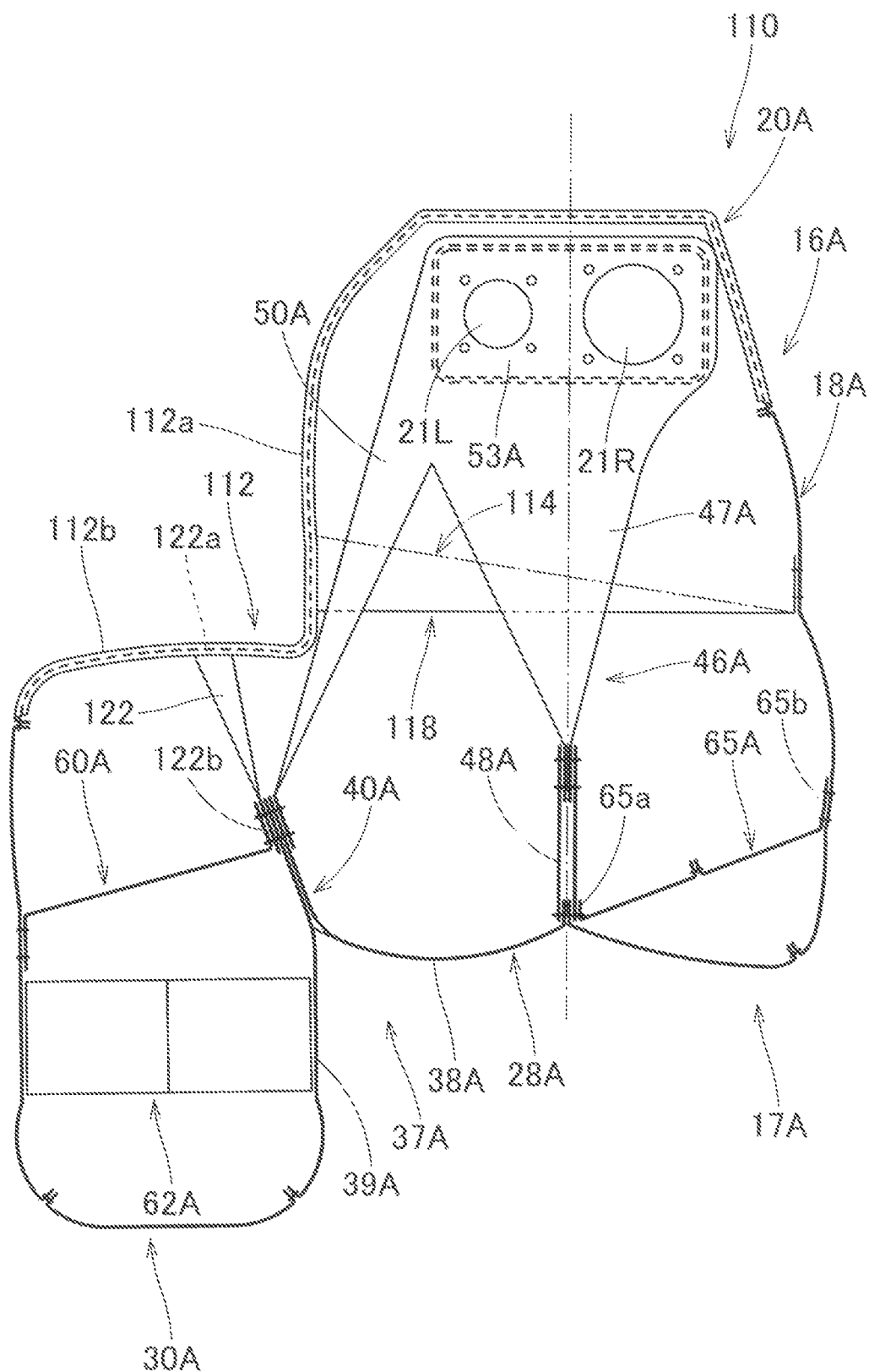
FIG. 18 is a schematic horizontal sectional view of the airbag of FIG. 16.
Figure 19:
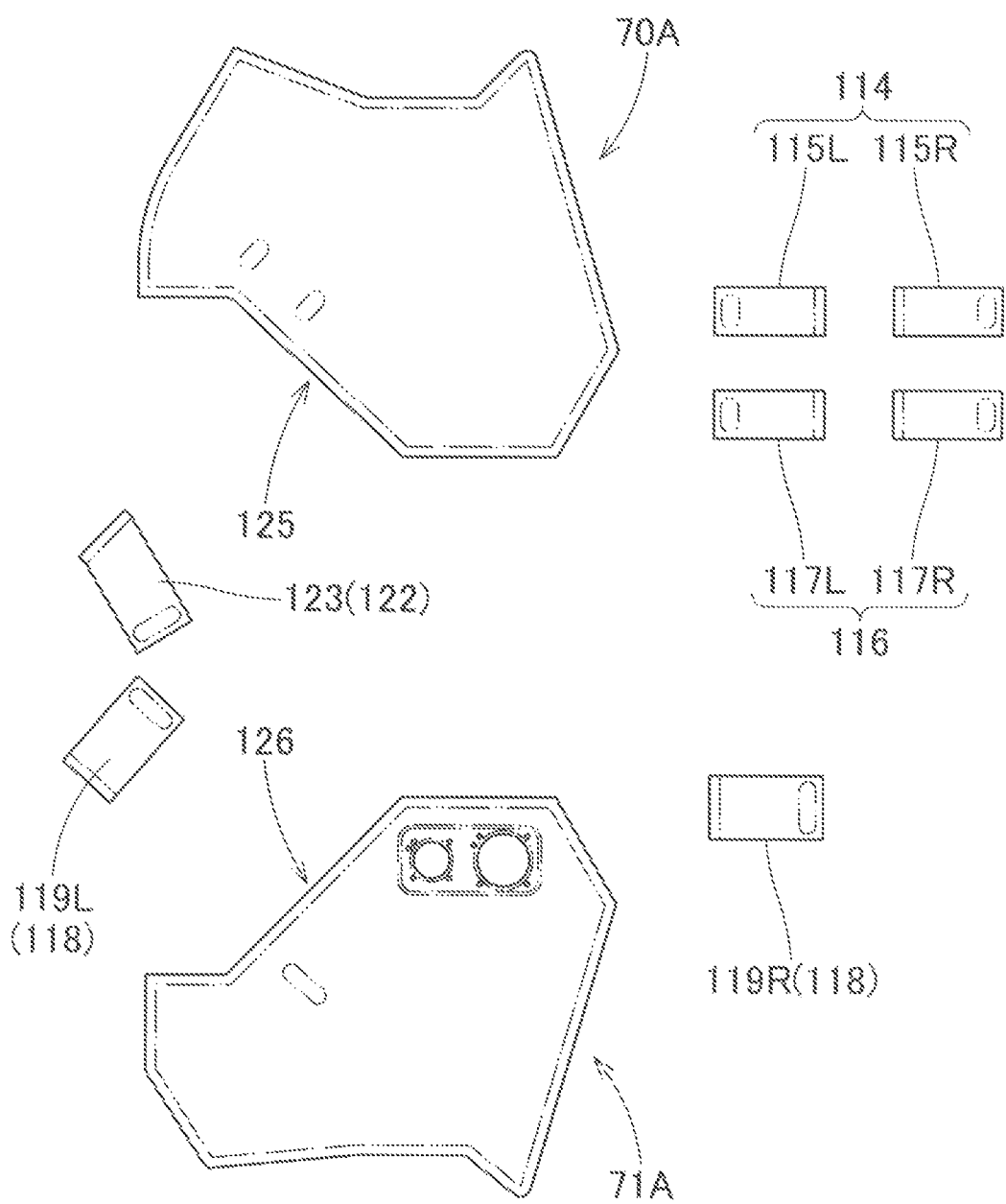
FIG. 19 depicts an upper panel, a lower panel and base cloths for forming tethers, of the airbag of FIG. 16.
Figure 20:
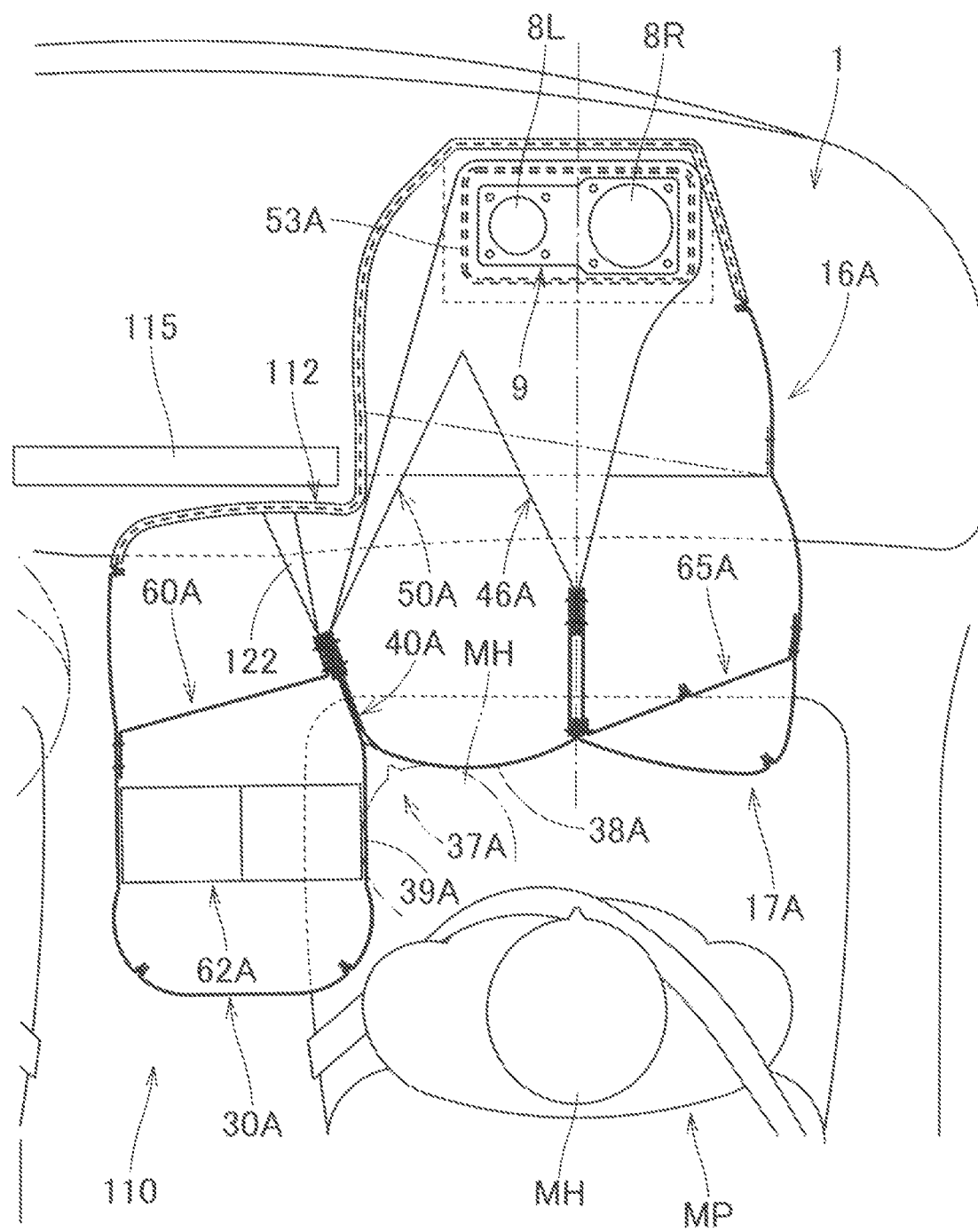
FIG. 20 is a schematic horizontal sectional view of an airbag device employing the airbag of FIG. 16, showing the airbag as completed deployment.

An airbag 110 according to an alternative embodiment of the invention is now described referring to FIGS. 16 to 20. As shown in FIG. 20, the airbag 110 is adapted to be mounted on a vehicle V2 which is provided with a display 105 of a vehicle navigation system. The display 105 is disposed at a vicinity of the center of the vehicle width in the dashboard 1, in front of a space between the driver's seat DS and passenger seat PS, in such a manner as to protrude upward out of the top plane 2 of the dashboard 1, thus serves as a protruding object.

Figure 16:
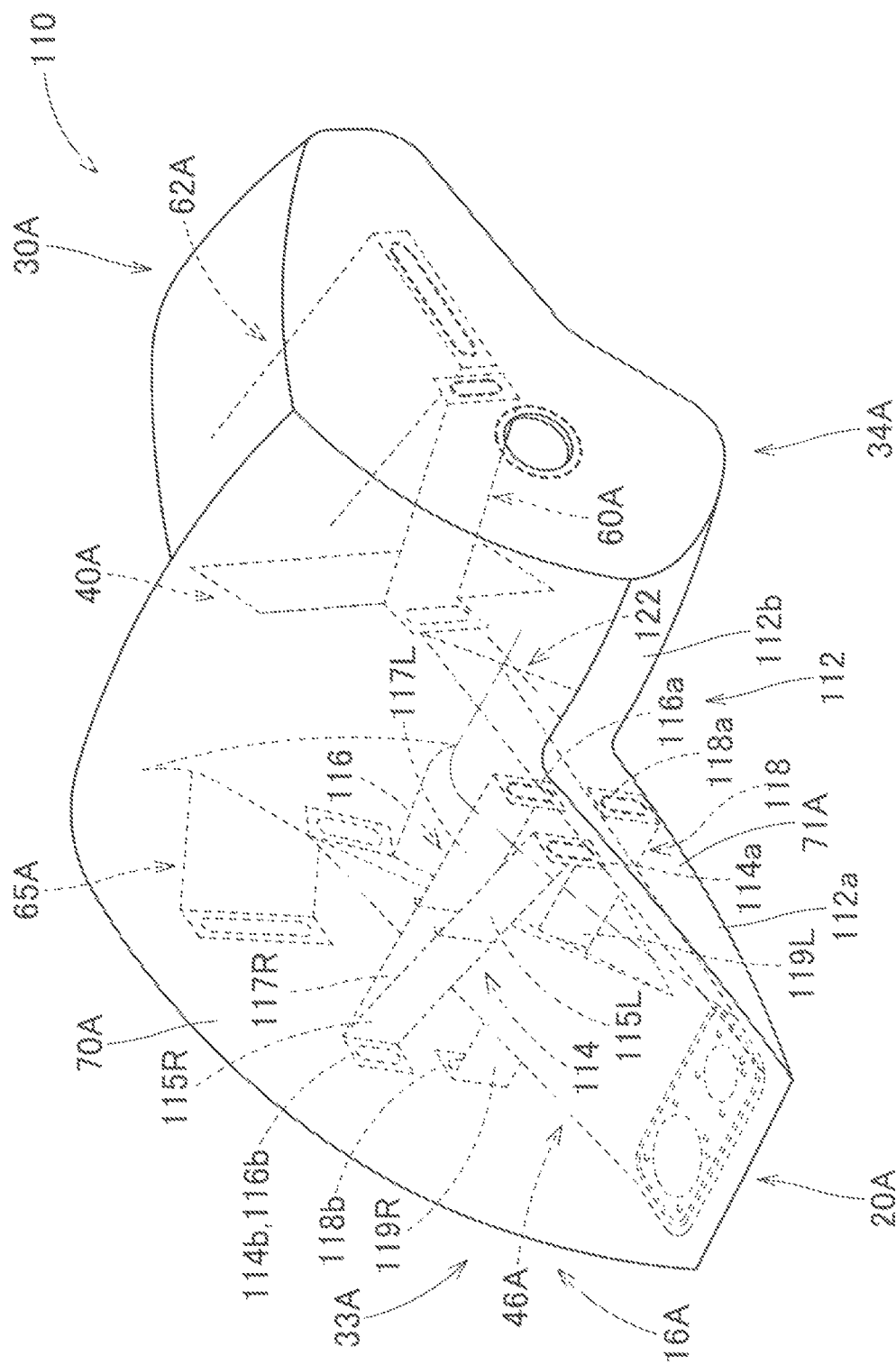
FIG. 16 is a perspective view of an airbag according to an alternative embodiment as inflated by itself, viewed from left front direction.

As shown in FIGS. 16 and 18, the airbag 110 is configured to deploy in such a contour as to circumvent the display (i.e. protruding object) 105 at deployment. As described later specifically, the bag body 16A of the airbag 110 includes a circumventing recess 112 for circumventing the display 105, and internally includes a plurality of left-right regulating tethers 114, 116 and 118 for forming the circumventing recess 112, an auxiliary regulating tether 122 for controlling the posture of the arresting recess 40A. Further, the airbag 110 is different from the airbag 15 of the foregoing embodiment in position of the left-right tether 65A which connects the front-rear tether 46A and right side wall 18*d*. Except those differences, the airbag 110 has a similar configuration to the airbag 15. Therefore, common members will be shown with common reference numerals having "A" at the ends, and will not be described in detail.

The circumventing recess 112 is formed at the left front region of the bag body 16A in such a manner as to dent or be recessed. As shown in FIGS. 16 and 18, the circumventing recess 112 of the illustrated embodiment is formed into such a contour that the right side plane and rear side plane are generally orthogonal as viewed from above or below the airbag 110. FIG. 19 depicts an upper panel 70A and a lower panel 71A for forming the bag body 16A. Each of the upper panel 70A and lower panel 71A is provided with a cut-out region 125/126 at the left front region for forming the circumventing recess 112. That is, the airbag 110 has such a contour that a front end region of the sub bag section 34 of the airbag 15 is removed, thus the sub bag section 34A of the airbag 110 communicates with the main bag section 33A only via the rear region.

Figure 17:
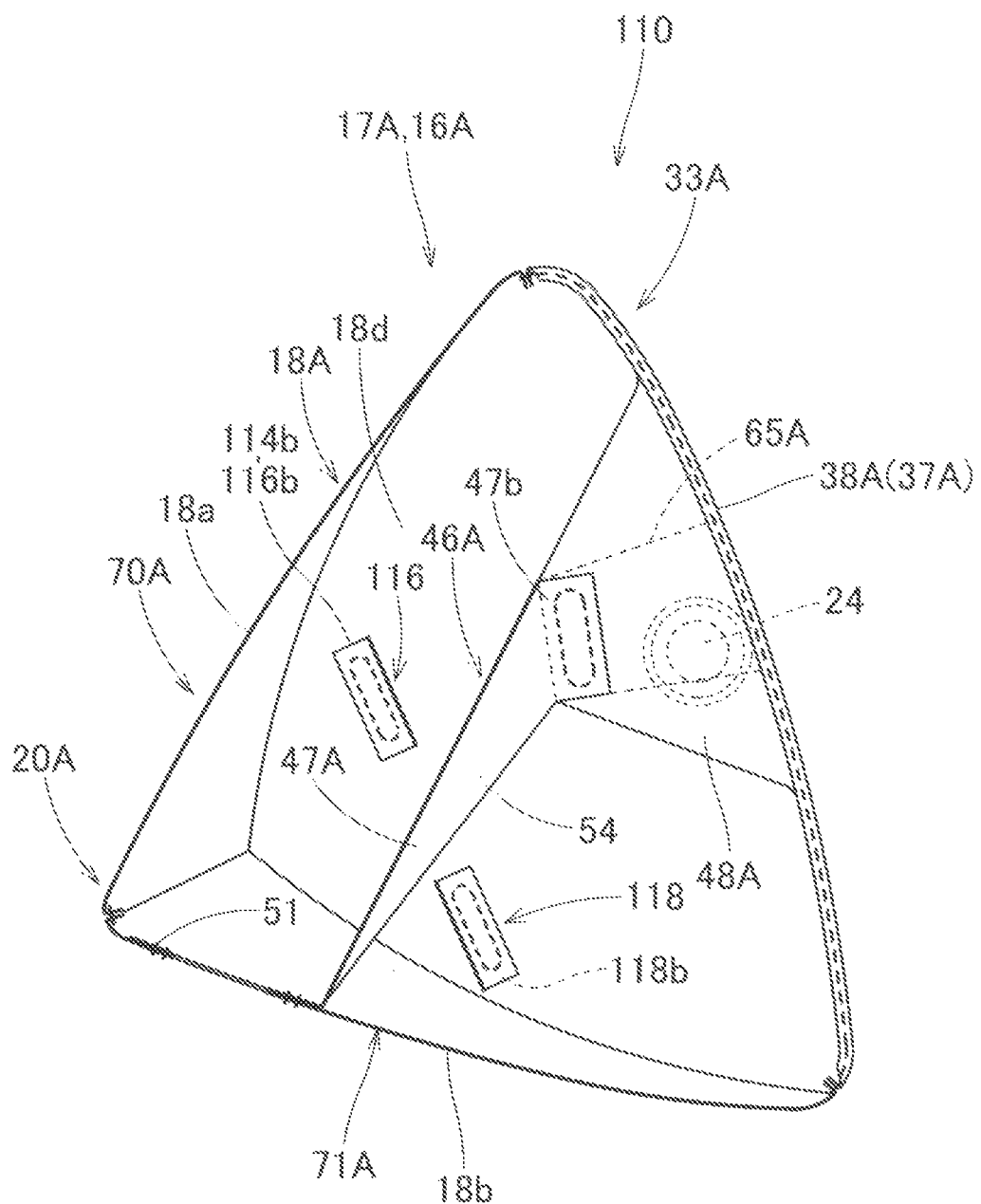
FIG. 17 is a schematic vertical section of the airbag of FIG. 16 taken at the location of a front-rear tether.

The left-right regulating tethers 114, 116 and 118 for forming the circumventing recess 112 are disposed inside the bag body 16A and each connect the right side plane 112*a* of the circumventing recess 112 (i.e. the front region of the left side wall 18*c*) and the right side wall 18*d*, and are disposed generally along a left and right direction, as shown in FIGS. 16 to 18. In the illustrated embodiment, the left-right regulating tethers 114 and 116 are disposed one behind the other at an area above the center in an up and down direction of the airbag 110. The left-right regulating tether 118 is disposed at an area below the center in an up and down direction of the airbag 110. The left ends 114*a* and 116*a* of the left-right regulating tethers 114 and 116 are jointed to different positions in a front and rear direction of the front region of the left side wall 18*c* while the right ends 114*b* and 116*b* are jointed together to the same position of the right side wall 18*d*. More specifically, the tether 116 disposed at the rear side deploys generally along a left and right direction, and the tether 114 disposed at the front side deploys at a slant with respect to a left and right direction with the left end 114*a* disposed at a farther forward position than the right end 114*b*, as shown in FIG. 16. The tether 118 disposed at the lower side is located immediately below the tether 116. The left end 118a is jointed to the front region of the left side wall 18c and the right end 118b is jointed to the right side wall 18d, thus deployable generally along a left and right direction. Each of the left-right regulating tethers 114, 116 and 118 is composed of a pair of base cloths 115L and 115R/117L and 117R/119L and 119R, each disposed in series in a left and right direction (FIGS. 16 and 19).

The auxiliary regulating tether 122 is provided to control the posture of the arresting recess 40A at airbag deployment in cooperation with the recess-pulling tether 50A and regulating tether 60A. In the illustrated embodiment, the auxiliary regulating tether 122 connects the bottom (or front end 40a) of the arresting recess 40A and the rear side plane 112b of the circumventing recess 112, so as to be deployable continuously with the arresting recess 40A, generally along a moving direction of the head MH of the passenger MP, as shown in FIGS. 16, 18 and 20. The auxiliary regulating tether 122 is composed of a piece of base cloth 123 depicted in FIG. 19. The auxiliary regulating tether 122 deploys in a such a twisted fashion that the rear end 122b jointed to the front end (or bottom) 40a of the arresting recess 40A extends generally along an up and down direction while the front end 122a jointed to the rear side plane 112b of the circumventing recess 112 extends generally along a left and right direction. The front end 122a of the auxiliary regulating tether 122 is joined (sewn) together when the circumferential edges of the cut-out regions 125 and 126 of the upper panel 70A and lower panel 71A are sewn together. The auxiliary regulating tether 122 is optional if the regulating tether 60A is able to control the posture of the arresting recess 40A sufficiently.

The left-right tether 65A of the airbag 110 connects the front-rear tether 46A and right side wall 18d inside the bag body 16A, in a similar fashion to the airbag 15 of the foregoing embodiment, but the left end 65a of the left-right tether 65A is jointed to a vicinity of the rear end of the rear section 48A of the front-rear tether 46A and the right end 65b is jointed to a position at the rear of the center in a front and rear direction of the right side wall 18d. Thus the left-right tether 65A is deployable at a slant with respect to a left and right direction as viewed from above or below, with the left end 65a disposed at a farther rearward position than the right end 65b.

The airbag device employing the airbag 110 configured as described above also includes the recess-pulling tether 50A which is jointed to the bottom (or front end 40a) of the arresting recess 40A and the front-rear tether 46A which is deployable generally along a front and rear direction inside the main bag section 33A for preventing the front-collision arresting plane 38A from moving rearward. The recess-pulling tether 50A and front-rear tether 46A are configured to bifurcate out of the mounting base 53A and share the mounting base 53A, and are mounted on the main bag section 33A by the mounting base 53A. Further, the mounting base 53A is mounted on the case 12 through the use of the retainer 9 together with the main bag section 33A. That is, the recess-pulling tether 50A is configured to extend from a position dislocated from the front-rear tether 46A in a left and right direction and disposed towards the sub bag section 40A (on the left side of the front-rear tether 46A) so as not to overlap with the front-rear tether 46A. With this configuration, the recess-pulling tether 50A is deployed generally along a front and rear direction, with little inclination with respect to a front and rear direction (FIG. 20), thus is capable of pulling the arresting recess 40A forward forcefully at the position dislocated from the front-rear tether 46A. Accordingly, in an initial stage of airbag deployment, the recess-pulling tether 50A and front-rear tether 46A will prevent an extensive area in a left and right direction of the main bag section 33A and sub bag section 34A from protruding rearward unduly out of the case 12, and further prevent the airbag 110 from bouncing back forward thereafter. That is, although the airbag includes no outer tether and the sub bag section 43A communicates with the main bag section 33A only at the rear region, the above configuration is capable of preventing the airbag 110 including the sub bag section 34A from oscillating in a front and rear direction repeatedly during deployment, and deploying the airbag 110 into a desired outer contour quickly. Moreover, the recess-pulling tether 50A and front-rear tether 46A are both disposed inside the airbag 110 and both mounted on the case 12 by the shared mounting base 53A with only one retainer 9. This will simplify the configuration of the airbag 110 and mounting work on the case 12, and further reduce the workload and cost in manufacturing of the airbag 110. Especially, although the airbag 110 is adapted to be mounted on the vehicle V2 in which the display 105 protrudes upward out of the dashboard 1, there will be no fear of interference between the display 105 and an outer tether since the airbag 110 has no such outer tether.

Furthermore, each of the airbags 15 and 110 includes the oblique-collision arresting plane 39/39A and arresting recess 40/40A at the position towards the driver's seat DS with respect to the front-collision arresting plane 38/38A. This configuration will help protect the head MH of a front seat passenger MP adequately as it moves diagonally forward and towards the center in a left and right direction of the vehicle V1/V2, in the event of an oblique collision or an offset collision of the vehicle V1/V2. However, if such an advantageous effect does not have to be considered, the location of the oblique-collision arresting plane and arresting recess should not be limited thereby. By way of example, the oblique-collision arresting plane and the arresting recess may be disposed only on a right side of the front-collision arresting plane (i.e. on the side facing outwardly), or further alternatively, the oblique-collision arresting plane and the arresting recess may be disposed both on the left side and right side of the front-collision arresting plane.

What is claimed is:

1. An airbag device for a front passenger seat adapted to be mounted on an instrument panel of a vehicle disposed in front of a front passenger seat, the airbag device comprising a housing which is adapted to be mounted on the instrument panel, an airbag which is housed in the housing in a folded-up configuration and inflatable with an inflation gas, and a mounting member which mounts the airbag on or at a vicinity of the housing, the airbag comprising:
   a main bag section that is mounted on the housing by a front end portion thereof with aid of the mounting member and deployable rearward out of the housing, a rear plane of the main bag section serving as a front-collision arresting plane for protecting a head of a front seat passenger in an event of a frontal collision of the vehicle;
   a sub bag section that is disposed on a right side or left side of the main bag section and includes a protruding region which protrudes farther rearward than the main bag section at an airbag deployment, a side plane of the protruding region which rises rearward out of the front-collision arresting plane and faces towards the front-collision arresting plane serves as an oblique-collision arresting plane for protecting the head of the passenger in an event of an oblique-collision or an offset collision of the vehicle;

an arresting recess that is recessed forward between the front-collision arresting plane and the oblique-collision arresting plane for receiving and arresting the head of the passenger therein;

a front-rear tether that is disposed inside the airbag and connects a front end portion of the airbag and the front-collision arresting plane for preventing the front-collision arresting plane from moving rearward at the airbag deployment, the front-rear tether being deployable generally along a front and rear direction;

a recess-pulling tether that is disposed inside the airbag and jointed to a bottom of the arresting recess for preventing the arresting recess from moving rearward at the airbag deployment; and a mounting base of the front-rear tether and the recess-pulling tether by which the front-rear tether and the recess-pulling tether are mounted on the housing with the aid of the mounting member together with the main bag section, wherein the front-rear tether and the recess-pulling tether share the mounting base and are configured to bifurcate rearward out of the mounting base; and wherein the front-rear tether extends from a rear edge region of the mounting base and the recess-pulling tether extends from an edge region of the mounting base adjoining the front-rear tether.

2. The airbag device for a front passenger seat of claim 1, wherein the airbag further internally comprises a regulating tether that connects the bottom of the arresting recess and a side plane of the sub bag section which is opposed to the oblique-collision arresting plane in a left and right direction, the regulating tether helps deploy the arresting recess generally along a moving direction of the head of the passenger which moves diagonally forward.

3. The airbag device for a front passenger seat of claim 1, wherein:
the recess-pulling tether comprises a first edge in a width direction which faces towards the sub bag section; and
the first edge extends from a front edge region of the mounting base.

4. The airbag device for a front passenger seat of claim 1, wherein the airbag further internally comprises a left-right tether that connects the front-rear tether and a side plane of the main bag section disposed apart from the oblique-collision arresting plane and is deployed generally along a left and right direction.

5. The airbag device for a front passenger seat of claim 1, wherein the sub bag section is disposed on a side of the main bag section adapted to face toward a driver's seat.

6. The airbag device for a front passenger seat of claim 1, wherein there are provided two of the sub bag section, including a left sub bag section on the left side of the main bag section, and a right sub bag section on the right side of the main bag section.

7. The airbag device for a front passenger seat of claim 1, wherein:
the sub bag section is disposed on a side of the main bag section adapted to face toward a driver's seat; and
the sub bag section comprises, at a front portion thereof adapted to face towards the instrument panel at the airbag deployment, a circumventing recess for circumventing an object which protrudes upward out of the instrument panel.

8. The airbag device for a front passenger seat of claim 7, wherein the airbag further internally comprises a regulating tether that connects the bottom of the arresting recess and a side plane of the sub bag section which is opposed to the oblique-collision arresting plane in a left- and right direction, the regulating tether helps deploy the arresting recess generally along a moving direction of the head of the passenger which moves diagonally forward.

9. The airbag device for a front passenger seat of claim 7, wherein:
the recess-pulling tether comprises a first edge in a width direction which faces towards the sub bag section; and
the first edge extends from a front edge region of the mounting base.

* * * * *